US006249752B1

United States Patent
Cunningham et al.

(10) Patent No.: US 6,249,752 B1
(45) Date of Patent: Jun. 19, 2001

(54) VIBRATING CONDUIT PARAMETER SENSORS, OPERATING METHODS AND COMPUTER PROGRAM PRODUCTORS UTILIZING REAL NORMAL MODAL DECOMPOSITION

(75) Inventors: Timothy J. Cunningham, Boulder; David F. Normen; Gary E. Pawlas, both of Louisville, all of CO (US); Stuart J. Shelley, Cincinatti, OH (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/116,410

(22) Filed: Jul. 16, 1998

(51) Int. Cl.[7] .................................................... G01F 25/00

(52) U.S. Cl. ........................ 702/100; 73/1.31; 73/1.34; 73/861.35; 73/861.356; 73/861.352

(58) Field of Search ..................... 73/861.356, 861.355, 73/861.357, 1.34, 1.31; 702/100, 104, 56

(56) References Cited

U.S. PATENT DOCUMENTS

| 4,777,833 | 10/1988 | Carpenter | 73/861.38 |
|---|---|---|---|
| 5,009,109 | 4/1991 | Kalotay et al. | 73/861.38 |
| 5,301,557 | 4/1994 | Cage et al. | 73/861.38 |
| 5,734,112 | 3/1998 | Bose et al. | 73/861.56 |

FOREIGN PATENT DOCUMENTS

| 196 34 663A1 | 3/1997 | (DE) . | |
|---|---|---|---|
| 0 578 113 A2 | 12/1984 | (EP) | G01F/1/84 |
| 0 701 107 A2 | 3/1996 | (EP) | G01F/1/00 |
| WO 92/14123 | 8/1992 | (WO) | G01F/1/84 |
| WO 95/16897 | 6/1995 | (WO) | G01L/9/00 |
| WO 95/29385 | 11/1995 | (WO) | G01F/1/84 |
| WO 97/40348 | 10/1997 | (WO) | G01F/1/84 |
| WO 98/07009 | 2/1998 | (WO) | G01F/1/84 |

OTHER PUBLICATIONS

Cunnigham; "Zero Shifts Due to Non–Proportional Damping", Micro Motion Report #10233, Part of IMAC XV, Feb. 1997, Session 8j, Structural Damping.

Bosse et al.; "Application of Modal Filtering Techniques to Vibration Control of Precision Truss", Ad–vol. 45/MD–vol. 54, Adaptive Structures and Composite Material, Analysis and Application ASME 1994, pp. 281–285.

(List continued on next page.)

*Primary Examiner*—Kamini Shah
(74) *Attorney, Agent, or Firm*—Chrisman, Bynum & Johnson, P.C.

(57) ABSTRACT

A plurality of motion signals is received representing motion at a plurality of locations of a vibrating conduit containing material. The received plurality of motion signals is processed to resolve the motion into a plurality of real normal modal components. A process parameter is estimated from a real normal modal component of the plurality of real normal modal components. According to one aspect, the motion signals may be processed by applying a mode pass filter to produce an output that preferentially represents a component of the motion associated with a real normal mode of the vibrating conduit. A process parameter may be estimated from the filtered output using, for example, conventional phase difference techniques. According to another aspect, real normal modal motion is estimated from the received plurality of motion signals, and a process parameter is estimated from the estimated real normal modal motion. For example, motion may be estimated in respective first and second real normal modes, the second real normal mode being preferentially correlated with a Coriolis force. A process parameter may be estimated by normalizing the estimated motion in the second real normal mode with respect to the estimated motion in the first real normal mode to produce a normalized estimate of motion in the second real normal mode, and by estimating a process parameter from the normalized estimate of motion in the second real normal mode.

58 Claims, 13 Drawing Sheets

OTHER PUBLICATIONS

Cunnigham; "Zero Shifts in Coriolis Sensors Due to Imbalance", Procedings if AIAA/ASME/ASCE/AHS/ASC 35 Structures, Structural Dynamics and Materials Conference, Apr. 18–20, 1994, AIAA Paper 94–1621 (A94–2411a).

Stack, Garnett, Pawlas; "A Finite Element For The Vibration Analysis of Fluid–Conveying Timoshenki Beam", AIAA, Paper 93–1552, pp. 1–10 (1993).

Timothy J. Cunnigham, Modal Anaylsis and Zero Stability of Coriolis Mass Flowmeters (1993) (M. of Science Thesis, Colorado State University (Fort Collins).

Rieder, Drahm, Type of Single Straight Tube Coriolis Mass Flowmeter , Flomenki '96, presented at the International Conference (1996), p. 250–255.

Stuart J. Shelley, Investigation of Discrete Modal Filters For Structural Dynamic Applications (1991) (Unpublished Ph. D. Dissertation, University of Cincinnatti).

VIBRATING CONDUIT PARAMETER SENSORS, OPERATING METHODS AND COMPUTER PROGRAM PRODUCTORS UTILIZING REAL NORMAL MODAL DECOMPOSITION

BACKGROUND OF THE INVENTION

1. Field of the Invention

The present invention relates to process parameter sensors, operating methods and computer program products, and more particularly, to vibrating conduit parameter sensors, operating methods and computer program products.

2. Statement of the Problem

Coriolis effect mass flowmeters are commonly used to measure mass flow and other information for materials flowing through a conduit. Exemplary Coriolis flowmeters are disclosed in U.S. Pat. No. 4,109,524 of Aug. 29, 1978, U.S. Pat. No. 4,491,025 of Jan. 1, 1985, and U.S. Pat. No. Re. 31,450 of Feb. 11, 1982, all to J. E. Smith et al. These flowmeters typically include one or more conduits having a straight or a curved configuration. Each conduit may be viewed as having a set of vibration modes, including, for example, simple bending, torsional, radial and coupled modes. In a typical mass flow measurement application, each conduit is driven to oscillate at resonance in one of its natural modes as a material flows through the conduit. The vibration modes of the vibrating, material-filled system are effected by the combined mass and stiffness characteristics of the conduits and the characteristics of the material flowing within the conduits.

A typical component of a Coriolis flowmeter is the drive or excitation system. The drive system operates to apply a periodic physical force to the conduit that causes the conduit to oscillate. The drive system typically includes at least one actuator mounted to the conduit(s) of the flowmeter. The actuator may comprise one of many well known electromechanical devices, such as a voice coil device having a magnet mounted to a first conduit and a wire coil mounted to a second conduit, in an opposing relationship to the magnet. A driver typically applies a periodic, e.g., a sinusoidal or square wave, drive signal to the actuator coil. The periodic drive signal causes the actuator to drive the two conduits in an opposing periodic pattern.

When there is effectively "zero" flow through a driven flowmeter conduit, points along the conduit tend to oscillate with approximately the same phase or a "zero-flow" phase with respect to the driver, depending on the mode of the driven vibration. As material begins to flow from an inlet of the flowmeter, through the conduit and out of an outlet of the flowmeter, Coriolis forces arising from the material flow tend to induce phase shifts between spatially separate points along the conduit, with the phase on the inlet side of the conduit generally lagging the actuator and the phase on the outlet side of the conduit generally leading the actuator. The phase shift induced between two locations on the conduit is approximately proportional to the mass flow rate of material through the conduit.

Unfortunately, the accuracy of measurements obtained using conventional phase shift or time delay methods can be compromised by nonlinearities and asymmetries in the flowmeter structure, as well as by vibration introduced into the flowmeter structure by external sources such as pumps. These effects may be reduced, for example, by using balanced mechanical designs that reduce the effects of external vibration and by using frequency domain filtering to remove frequency components associated with undesirable vibrations. However, mechanical design approaches may be constrained by geometric considerations, and frequency domain filtering may be ineffective at removing unwanted vibrational energy that occurs at or near resonant frequencies of interest, e.g., the drive frequency used to excite the conduit.

SUMMARY OF THE INVENTION

In light of the foregoing, it is an object of the present invention to provide vibrating conduit parameter sensors, operating methods and computer program products which can provide accurate estimates of process parameters in sensor conduits having structural nonlinearities and asymmetries and in the presence of external vibration.

This and other objects, features and advantages are provided by vibrating conduit process parameter sensors, operating methods and computer program products in which motion signals representing motion of a vibrating conduit are processed to resolve the conduit motion into a plurality of real normal modal components from which a process parameter such as mass flow may be estimated. In an embodiment of the present invention, a mode pass filter is applied to the motion signals to produce an output that preferentially represents a component of the conduit motion associated with one or more real normal modes, for example, one or more real normal modes that are preferentially correlated with Coriolis force associated with a material in the conduit. An estimate of a process parameter such as mass flow may then be generated from the output using, for example, conventional phase difference techniques. In another embodiment according to the present invention, real normal modal motion is estimated from the plurality of motion signals and a process parameter is estimated from a subset of the estimated real normal modal motion, e.g., from motion in real normal modes that are preferentially correlated with Coriolis force.

Because the conduit motion is resolved into real normal modal components, more accurate estimates of process parameters can be obtained. For example, a mode pass filter may pass components of the conduit motion corresponding to real normal modes that are closely correlated with Coriolis forces, while attenuating components of the conduit motion associated with external noise sources. The filtered output may be thus be less corrupted by noise and vibration, and can therefore be advantageously used to generate an accurate estimate of a process parameter such as mass flow. Similarly, estimated real normal modal motion of selected modes correlated with Coriolis force may be used to generate an accurate estimate of a process parameter while disregarding modal motion that is attributable to other sources.

In particular, according to the present invention, a process parameter sensor for determining a process parameter includes a conduit configured to contain material, and a plurality of motion transducers operative to produce a plurality of motion signals representing motion at a plurality of locations of the conduit. A real normal modal resolver is responsive to the plurality of motion transducers and operative to process the plurality of motion signals to resolve the motion represented by the plurality of motion signals into a plurality of real normal modal components. A process parameter estimator is responsive to the real normal modal resolver and operative to estimate a process parameter from a real normal modal component of the plurality of real normal modal components.

In an embodiment of the present invention, the real normal modal resolver comprises a mode pass filter operative to produce an output from the plurality of motion signals that preferentially represents a component of the motion associated with a real normal mode of the conduit, for example, a real normal mode that is preferentially correlated with Coriolis force. The process parameter estimator is responsive to the mode pass filter and operative to estimate a process parameter from the output.

In another embodiment of the present invention, the real normal modal resolver comprises a real normal modal motion estimator operative to estimate real normal modal motion from the received plurality of motion signals. The process parameter estimator is operative to estimate a process parameter from the estimated real normal modal motion, for example, from estimated motion for a set of real normal modes closely correlated with Coriolis force. The real normal modal motion estimator may comprise means for estimating motion in a first real normal mode and means for estimating motion in a second real normal mode that is preferentially correlated with a Coriolis force. The process parameter estimator may include means for normalizing the estimated motion in the second real normal mode with respect to the estimated motion in the first real normal mode to produced a normalized estimate of motion in the second real normal mode. Means may be provided for estimating a process parameter from the normalized estimate of motion in the second real normal mode.

According to method aspects of the present invention, a plurality of motion signals are received representing motion at a plurality of locations of a vibrating conduit containing material. The received plurality of motion signals is processed to resolve the motion into a plurality of real normal modal components. A process parameter is estimated from a real normal modal component of the plurality of real normal modal components.

According to a method aspect of the present invention, the motion signals may be processed to produce an output that preferentially represents a component of the motion associated with a real normal mode of the vibrating conduit. A mode pass filter may be applied to the plurality of motion signals and a process parameter estimated from the filtered output. For example, first and second filtered signals may be produced representing motion at respective first and second locations of the conduit. A process parameter may be estimated by determining a phase difference between the first filtered signal and the second filtered signal and estimating mass flow from the determined phase difference.

According to another method aspect of the present invention, real normal modal motion, i.e., motion in a plurality of single degree of freedom (SDOF) systems, is estimated from the received plurality of motion signals. A process parameter is estimated from the estimated real normal modal motion. For example, motion may be estimated in respective first and second real normal modes, the second real normal mode being preferentially correlated with a Coriolis force. A process parameter may be estimated by normalizing the estimated motion in the second real normal mode with respect to the estimated motion in the first real normal mode to produce a normalized estimate of motion in the second real normal mode. A process parameter may be established from the normalized estimate of motion in the second real normal mode.

According to other aspects of the present invention, a plurality of real normal modes is excited in a conduit, a plurality of motion signals is received representing motion in response to the excitation and the plurality of motion signals are processed to resolve the conduit motion into a plurality of real normal modal components from which a process parameter may be estimated. The excitation applied to the conduit may be broadband excitation, such as a series of substantially coherent excitations of varying frequencies or excitation produced by transferring energy from a material in said conduit through, for example, fluid-structure interaction (FSI).

A computer program product for estimating a process parameter according to the present invention includes first computer readable program code means for processing a plurality of motion signals representing motion of a conduit containing material to resolve the motion into a plurality of real normal modal components. Second computer readable program code means estimate a process parameter from a real normal modal component of the plurality of real normal modal components. In a first embodiment, the first computer readable program code means comprises computer readable program code means for processing the plurality of motion signals to produce an output that preferentially represents a component of the motion associated with a real normal mode of the vibrating conduit. The second computer readable program code means comprises computer readable program code means for estimating a process parameter from the output. In another embodiment, the computer readable program code means comprises computer readable program code means for estimating real normal modal motion from the plurality of motion signals. The second computer readable program code means comprises computer readable program code means for estimating a process parameter associated with the material from the estimated real normal modal motion. Improved process parameter estimates may thereby be provided.

DETAILED DESCRIPTION OF EMBODIMENTS

Figure 1:
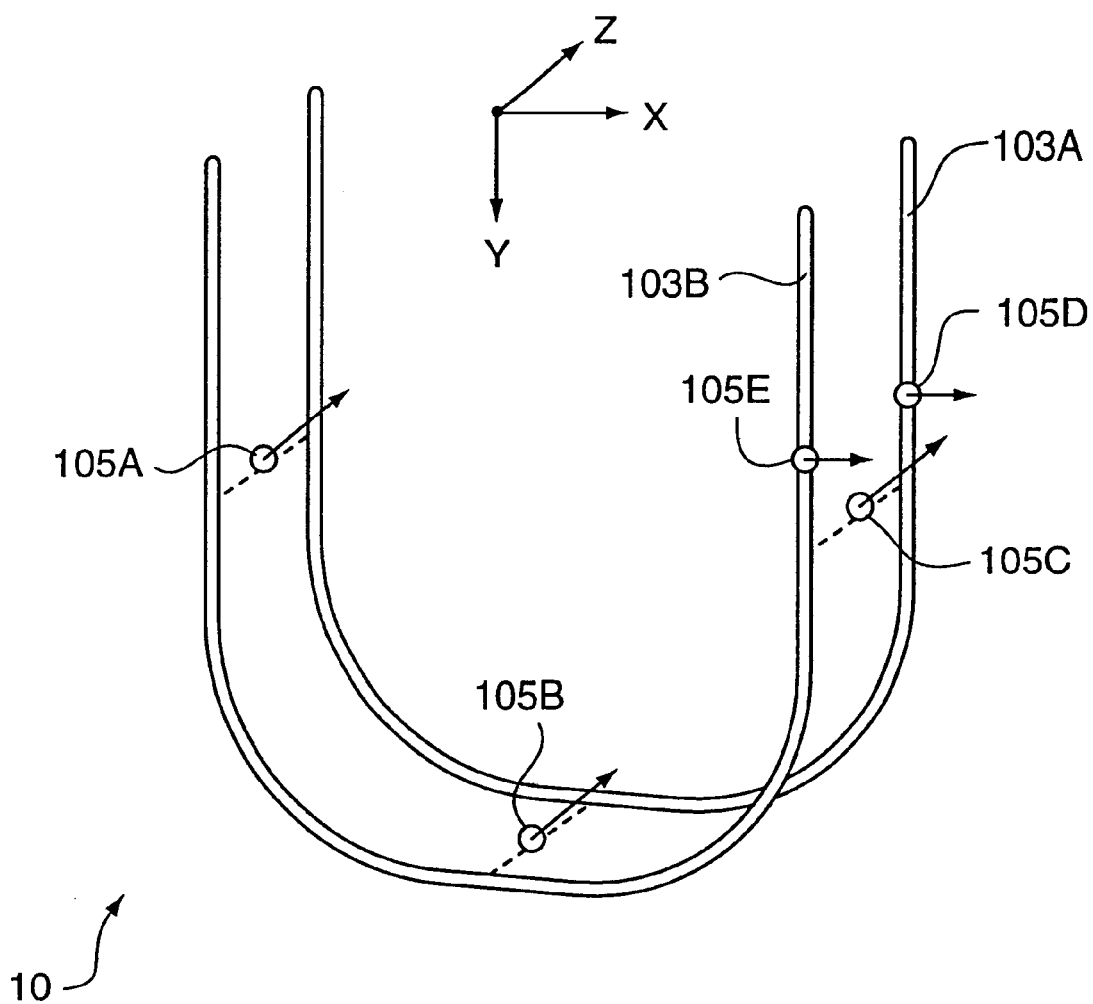
FIG. 1 illustrates an exemplary process parameter sensor conduit structure.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The following discussion in large part refers to Coriolis flowmeters in which a process parameter of a material processing system, e.g., mass flow rate, is estimated for a material such as a fluid flowing through a vibrating conduit. Those skilled in the art will appreciate, however, that the present invention is also applicable to vibrating conduit process parameter sensors other than in-line sensors. For example, the present invention is applicable to sampling-type vibrating-tube densitometers that include a conduit configured to contain a sample of a material extracted from a material processing system.

In embodiments described herein, motion signals representing motion of a sensor conduit are processed to resolve the conduit motion into a plurality of real normal modal components. Real normal modal decomposition may be implemented in a number of ways. For example, a mode pass filter may be employed to pass components of sensor conduit motion that are associated with a set of desired real normal modes while attenuating components of the conduit motion associated with other, undesirable real normal modes. Although modal responses corresponding to the conduit motion need not be explicitly determined, the model pass filtering nonetheless "resolves" the conduit motion into respective components associated with respective real normal modes.

Alternatively, real normal modal motion, i.e., motion in the coordinate systems of a plurality of single degree of freedom (SDOF) systems, can be explicitly estimated from the motion signals and used to generate process parameter estimates. For example, mode pass filtering may be achieved using a two-step process involving application of a modal transformation to transform the conduit motion to corresponding real normal modal motion, and application of a selective inverse modal transformation to the real normal modal motion to produce a filtered output that preferentially represents components of the conduit motion associated with one or more desired real normal modes. This filtered output can be processed to estimate a process parameter using, for example, conventional phase difference techniques.

According to another aspect of the present invention, a process parameter is directly determined from an estimated real normal modal motion. For example, real normal modal motion for a real normal mode that is closely correlated with Coriolis force is normalized with respect to a real normal modal motion of another mode to generate a scaling factor. The scaling factor is used to estimate mass flow.

Modal Behavior of a Vibrating Conduit

Behavior of a vibrating structure such as a sensor conduit may be described in terms of one or more natural modes having associated natural frequencies of vibration. The modes and the associated natural frequencies may be mathematically described by eigenvectors and associated eigenvalues, the eigenvectors being unique in relative magnitude but not absolute magnitude and orthogonal with respect to the mass and stiffness of the structure. The linearly independent set of vectors may be used as a transformation to uncouple equations that describe the structure's motion. In particular, the response of the structure to an excitation can be represented as a superposition of scaled modes, the scaling representing the contribution of each mode to the motion of the structure. Depending on the excitation, some modes may contribute more than others. Some modes may be undesirable because they may contribute energy at the resonant frequency of desired modes and therefore may corrupt measurements taken at the resonant frequency of a desired mode, such as phase difference measurements taken at the drive frequency.

Conventional flowmeters typically use structural and temporal filtering to reduce the effects of undesirable modes. Conventional structural filtering techniques include using mechanical features such as brace bars designed to decouple in phase and out of phase bending modes, actuators positioned such that they are less likely to excite undesirable modes and transducers placed such that they are less sensitive to undesirable modes. Structural filtering techniques can be very effective in reducing energy of undesired modes, but may be limited by geometric and fabrication constraints.

Temporal filtering techniques typically modify transducer signals based on time domain or frequency domain parameters. For example, a typical Coriolis flowmeter may include frequency domain filters designed to remove frequency components that are significantly correlated with undesired modes. However, off-resonance energy from undesired modes may contribute considerably to energy at the resonant frequency of a desired mode. Because frequency-domain filters generally are ineffective at distinguishing the contribution of multiple modes at a given frequency, the contribution of undesired modes at a measurement frequency may be a significant source of error in process parameter measurements.

A sensor conduit structure with negligible damping and zero flow may be assumed to have purely real natural or normal modes of vibration, i.e., in each mode, each point of the structure reaches maximum displacement simultaneously. However, a real conduit having non-negligible damping and a material flowing therethrough has a generally complex response to excitation, i.e., points of the structure generally do not simultaneously reach maximum amplitude. The motion of the conduit structure may be described as a complex mode having real and imaginary components or, alternatively, magnitude and phase components. Coriolis forces imparted by the flowing material introduce the complexity into the motion of the sensor conduit.

Even if complex, motion of a conduit structure can be described as a superposition of scaled natural or "normal" modes, as the real and imaginary parts of a complex mode are linearly independent by definition. To represent complex motion, complex scaling coefficients are used in combining the constituent real normal modes. Particular real normal modes may be closely correlated with the imaginary component of the complex mode while being significantly less correlated with the real component of the complex mode. Accordingly, these particular real normal modes may be more closely correlated with the Coriolis forces associated with the material in the sensor conduit, and thus can provide information for generating an accurate estimate of a parameter associated with the material.

As an illustrative example, a dual curved tube 3-inch Coriolis flowmeter was analyzed. A conceptual model of the conduit structure of this meter is illustrated in FIG. 1. Conventional velocity transducers 105A, 105B, 105C, oriented to measure velocity in a direction z, were positioned at respective left, drive and right locations on the conduit assembly 10. Respective accelerometers 105D, 105E were placed on respective ones of the conduits 103A, 103B, near the right transducer location, and were oriented to measure lateral acceleration along a direction x. The outputs of the accelerometers 105D, 105E were integrated to produce lateral absolute velocity information.

A response vector $\{x_{response}\}$ can be constructed from the outputs of the motion transducers 105A–E:

$$\{x_{response}\} = \begin{bmatrix} \text{right response, } z \\ \text{drive response, } z \\ \text{left response, } z \\ \text{skewed lateral response, } xz \\ \text{lateral response, } x \end{bmatrix}, \quad (1)$$

where the skewed lateral response is a reponse along a direction 45 degrees with respect to the x and z axes. A real normal modal "filter" matrix $[\Phi]$, i.e., a real normal modal transformation matrix relating the physical motion vector $\{x_{response}\}$ to a real normal modal motion vector $\{\eta\}$, may be identified such that:

$$\{x_{response}\} = [\Phi]\{\eta\}. \quad (2)$$

The real normal modal transformation matrix $[\Phi]$ can be identified using a number of techniques. For example, trial and error or inverse techniques may be used as described in U.S. patent application Ser. No. 08/890,785, filed Jul. 11, 1997, assigned to the assignee of the present application and incorporated by reference herein in its entirety as if the text is physically present, and in a U.S. patent application entitled "Generalized Modal Space Drive Control for a Vibrating Tube Process Parameter Sensor", filed Feb. 25, 1998, assigned to the assignee of the present application and incorporated by reference herein in its entirety as if the text is physically present.

For the exemplary conduit structure 10 of FIG. 1, a real normal modal transformation matrix $[\Phi]$ was experimentally determined:

$$[\Phi] = \begin{bmatrix} 5.893 & 0.033 & -0.198 & -11.958 & 11.95 \\ 14.973 & 0.085 & -0.68 & -7.666 & -10.388 \\ 6.024 & -0.15 & -0.169 & 12.312 & 12.239 \\ 1.891 & 0.84 & 1.33 & 3.6 & 3.864 \\ 0.124 & 1.728 & -3.587 & 0.198 & 0.232 \end{bmatrix} \left( \frac{\text{lbf} \cdot \text{sec}^2}{\text{in}} \right)^{-\frac{1}{2}} \quad (3)$$

From left to right, the columns of the real normal modal transformation matrix $[\Phi]$ represent a first out of phase bend mode, an in-phase lateral mode, an out of phase lateral mode, an out of phase twist mode and a second out of phase bend mode, respectively.

The modal transformation matrix $[\Phi]$ can be used to resolve the physical motion represented by the motion vector $\{x_{response}\}$ into real normal modal components. For example, Equation (2) may be explicitly solved for the modal motion vector $\{\eta\}$, by premultiplying both sides of Equation (2) by the inverse of the modal transformation matrix $[\Phi]$:

$$\{\eta\} = [\Phi]^{-1}\{x_{response}\}, \quad (4)$$

where, for the exemplary structure of FIG. 1, $$[\Phi]^{-1} = \begin{bmatrix} 0.0056 & 0.0498 & 0.0326 & 0.0135 & -0.0063 \\ -0.08 & 0.0002 & -0.1999 & 0.6436 & 0.2485 \\ -0.0035 & 0.0002 & -0.0916 & 0.3109 & -0.1591 \\ -0.418 & 0.0 & 0.0394 & 0.0044 & 0.0021 \\ 0.0391 & -0.0245 & 0.0223 & 0.0011 & 0.0019 \end{bmatrix} \quad (5)$$

$$\left( \frac{\text{lbf} \cdot \text{sec}^2}{\text{in}} \right)^{\frac{1}{2}}.$$

As described in detail herein, the real normal modal motion $\{\eta\}$ may be used directly to estimate a process parameter associated with one or more of the real normal modes of the conduit structure, e.g., modes associated with Coriolis force. Alternatively, the modal transformation matrix $[\Phi]$ may be used to identify a mode pass filter which may be applied to the physical motion $\{x_{response}\}$ to produce a filtered physical domain response that preferentially includes components of the physical motion $\{x_{response}\}$ associated with one or more modes of the conduit. This filtered response may be used to estimate a process parameter.

Figure 2:
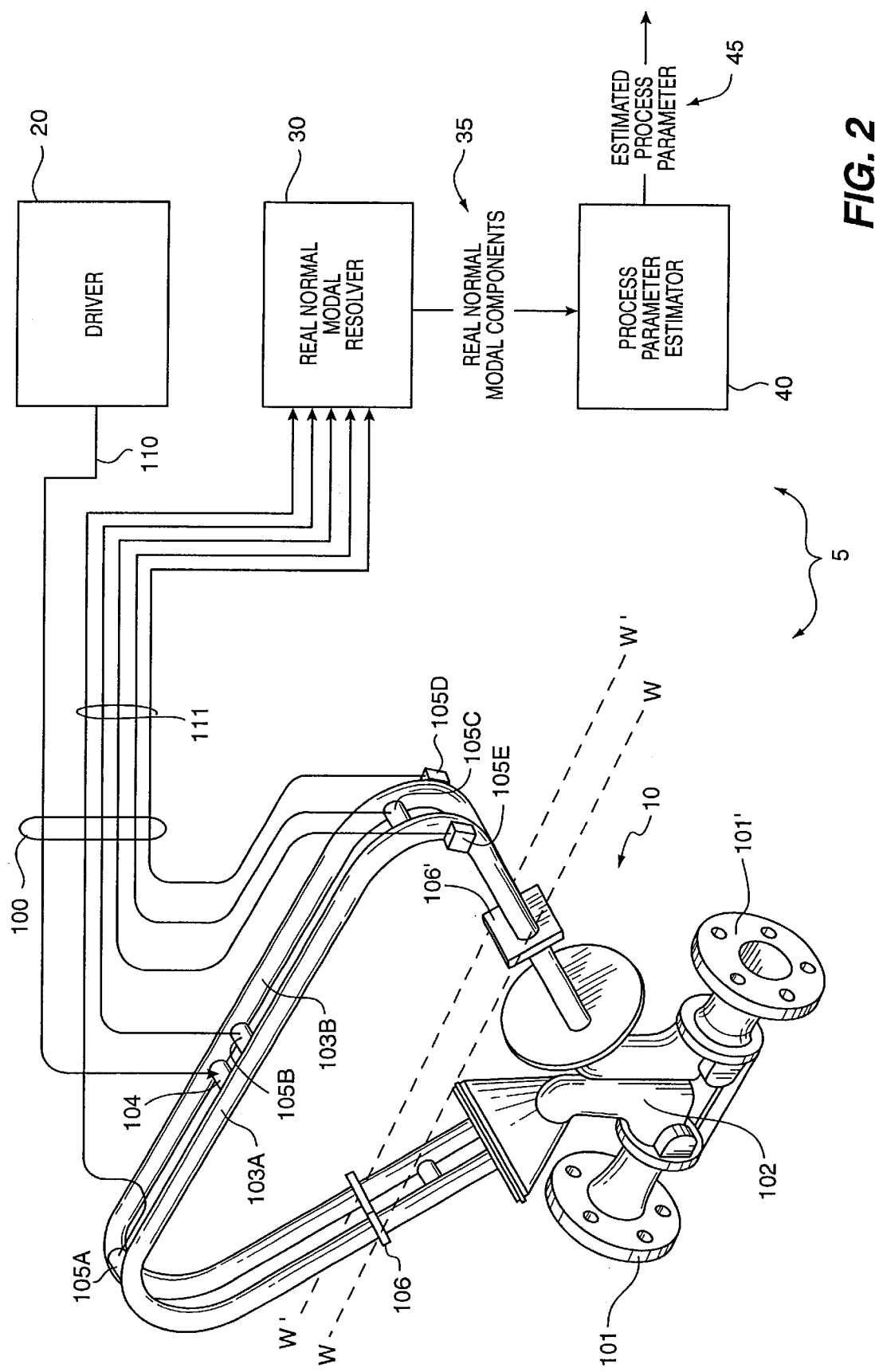
FIG. 2 illustrates an embodiment of a process parameter sensor according to the present invention.

FIG. 2 illustrates an exemplary embodiment of a vibrating conduit parameter sensor 5 according to the present invention. The sensor 5 includes a conduit assembly 10. The conduit assembly 10 includes an inlet flange 101, an outlet flange 101', a manifold 102 and first and second conduits 103A, 103B. Brace bars 106, 106' connect the conduits 103A, 103B. Connected to the conduits 103A, 103B is an actuator 104 that is operative to vibrate the conduits 103A, 103B responsive to a driver 20. A plurality of motion transducers 105A–E is operative to produce a plurality of motion signals representing motion at a plurality of locations of the conduits 103A, 103B, e.g., signals representing displacement, velocity or acceleration of the conduits 103A, 103B. The motion transducers 105A–E may include a variety of devices, such as coil-type velocity transducers, optical or ultrasonic motion sensors, accelerometers, inertial rate sensors and the like. Leads 100 are connected to the actuator 104 and the motion transducers 105A–E.

When the conduit assembly 10 is inserted into a material processing system 1, material flowing in the material processing system 1 enters the conduit assembly 10 through the inlet flange 101. The material then flows through the manifold 102, where it is directed into the conduits 103A, 103B. After leaving the conduits 103A, 103B, the material flows back into the manifold 102 and exits the meter assembly 10 through the outlet flange 101'. As the material flows through the conduits 103A, 103B, it gives rise to Coriolis forces that perturb the conduits 103A, 103B.

The conduits 103A, 103B may be driven by the actuator 104 in opposite directions about their respective bending axes W—W and W'—W', inducing what is commonly referred to as a first out of phase bending mode in the conduit assembly 10. The actuator 104 may comprise any one of many well-known devices, such as linear actuator including a magnet mounted to the first conduit 103A and an opposing coil mounted to the second conduit 103B. An alternating current induced by a drive signal provided by a driver 20 via a drive lead 110 passes through the coil, generating mechanical force that vibrates the conduits 103A, 103B. The excitation supplied by the actuator 104 may be substantially coherent, e.g., confined to a narrow frequency range, or may be broadband, as described in greater detail below.

Although the parameter sensor 5 illustrated in FIG. 2 is shown as including an integral actuator 104, those skilled in the art will appreciate that vibration of the conduits 103A, 103B according to the present invention may be achieved by other techniques. For example, broadband excitation may be generated external to the conduit assembly 10 by such sources as pumps or compressors and conveyed to the conduit assembly 10, for example, via one of the flanges 101, 101'. Similarly, broadband excitation may be generated by transfer of energy from a material in the conduits 103A, 103B through a fluid-structure interaction (FSI) mechanism, as described in greater detail below.

A real normal modal resolver 30 is responsive to the motion transducers 105A–E, and is operative to resolve motion of the conduits 103A, 103B represented by signals on the leads 111 into a plurality of real normal modal components 35. A process parameter estimator 40 is responsive to the real normal modal resolver 30 and operative to generate an estimate 45 of a process parameter from the plurality of real normal modal components 35. As described herein, the real normal modal resolver 30 may resolve the conduit motion in a number of ways, such as by mode pass filtering the conduit motion or by estimating a real normal modal motion corresponding to the conduit motion.

Mode Pass Filtering

According an aspect of the present invention, a "mode pass filter" is applied to motion signals to produce an output representing a filtered form of the conduit motion in which components of the conduit motion associated with undesired modes are attenuated. The mode pass filter represents a product of real normal modal transformation that maps motion of the conduit into motion in a plurality of single degree of freedom (SDOF) systems, i.e., a real normal modal motion, and a selective inverse real normal modal transformation that maps selected portions of the real normal modal motion, i.e., motion in a set of desired real normal modes, back to the physical domain.

A selective inverse real normal modal transformation matrix $[\Phi]$ can be used to translate a real normal modal motion vector $\{\eta\}$ to a filtered motion vector $\{x_{filtered}\}$ in which components associated with undesired real normal modes are attenuated:

$$\{x_{filtered}\} = [\Phi^*]\{\eta\}. \quad (6)$$

For the exemplary structure of FIG. 1, a selective inverse real normal modal transformation matrix $[\Phi]$ was constructed from the real normal modal transformation matrix $[\Phi]$ with by replacing those elements of the real normal modal transformation matrix $[\Phi]$ associated with the undesired real normal modes with zeroes:

$$[\Phi^*] = \begin{bmatrix} 5.893 & 0 & 0 & -11.958 & 0 \\ 14.973 & 0 & 0 & -7.666 & 0 \\ 6.024 & 0 & 0 & 12.312 & 0 \\ 1.891 & 0 & 0 & 3.6 & 0 \\ 0.124 & 0 & 0 & 0.198 & 0 \end{bmatrix} \left( \frac{lbf \cdot sec^2}{in} \right)^{-\frac{1}{2}}. \quad (7)$$

As shown in Equations (6) and (7), components of the conduit motion vector $\{x_{response}\}$ corresponding to undesired real normal modes may be attenuated by employing a selective inverse real normal modal transformation matrix $[\Phi]$ that corresponds to the real normal modal transformation matrix $[\Phi]$ with zeroes replacing those elements of the real normal modal transformation matrix $[\Phi]$ associated with the undesired real normal modes. Those skilled in the art will appreciate, however, that attenuation of these components could be achieved using nonzero values for these elements of the selective inverse real normal modal transformation matrix $[\Phi]$.

Combining Equations (4) and (6):

$$\{x_{filtered}\} = [\Phi^*][\Phi]^{-1}\{x_{response}\} = [\Psi]\{x_{response}\}, \quad (8)$$

where the mode pass filter matrix $[\Psi]$ is given by $$[\Psi] = [\Phi^*][\Phi]^{-1}. \quad (9)$$

The mode pass filter matrix $[\Psi]$ processes the conduit motion vector $\{x_{response}\}$ such that the filtered output motion vector $\{x_{response}\}$ preferentially represents components of the conduit motion vector $\{x_{response}\}$ associated with one or more desired modes. The mode pass filter matrix $[\Psi]$ may also be generated by:

$$[\Psi] = [\Phi][A][\Phi]^{-1},$$

where $[A]$ is a matrix whose off-diagonal elements are zeros, with selected diagonal elements correponding to desired modes set to one, e.g., $$[A] = \begin{bmatrix} 1 & 0 & \cdots & 0 \\ 0 & 0 & & 0 \\ \vdots & & \ddots & \vdots \\ 0 & \cdots & & 1 \end{bmatrix}.$$

The filtered output $\{x_{filtered}\}$ may be processed to generate accurate estimates of process parameters such as mass flow. For example, the filtered output $\{x_{filtered}\}$ may be processed according to conventional phase or time difference Coriolis measurement techniques. For the exemplary system illustrated in FIG. 1, this could be done by determining a phase difference between components of the filtered output corresponding to the right and left transducers 105A, 105C, e.g., using zero crossing or similar phase difference techniques such as those described in U.S. Pat. No. RE31,450 to Smith, U.S. Pat. No. 4,879,911 to Zolock, and U.S. Pat. No. 5,231,884 to Zolock, or similar phase or time difference techniques utilizing a digital signal processor (DSP) or similar digital computing device. Information provided by the additional transducers 105B, 105D, 105E thereby may be used to filter out components of the conduit motion that are associated with, for example, undesired lateral modes.

The number of locations on a sensor conduit represented by motion signals can be deliberately chosen to exceed the number of real normal modal components into which conduit motion is resolved. In such a case, the real normal modal transformation matrix and the selective inverse real normal modal transformation matrix has more rows than columns. Accordingly, a generalized inverse of the real normal modal transformation matrix would be utilized in computing the mode pass filter matrix in Equation (9). In this manner the motion signals provide an overdetermined source of information for resolving conduit motion into the given number of real normal modes. Process parameters estimated from such overdetermined information are thus spatially integrated, providing potentially more accurate estimates. Spatial integration is described in a U.S. patent application entitled "Improved Vibrating Conduit Parameter Sensors and Methods of Operation Therefore Utilizing Spatial Integration," assigned to the assignee of the present application and filed concurrently herewith.

Figure 3:
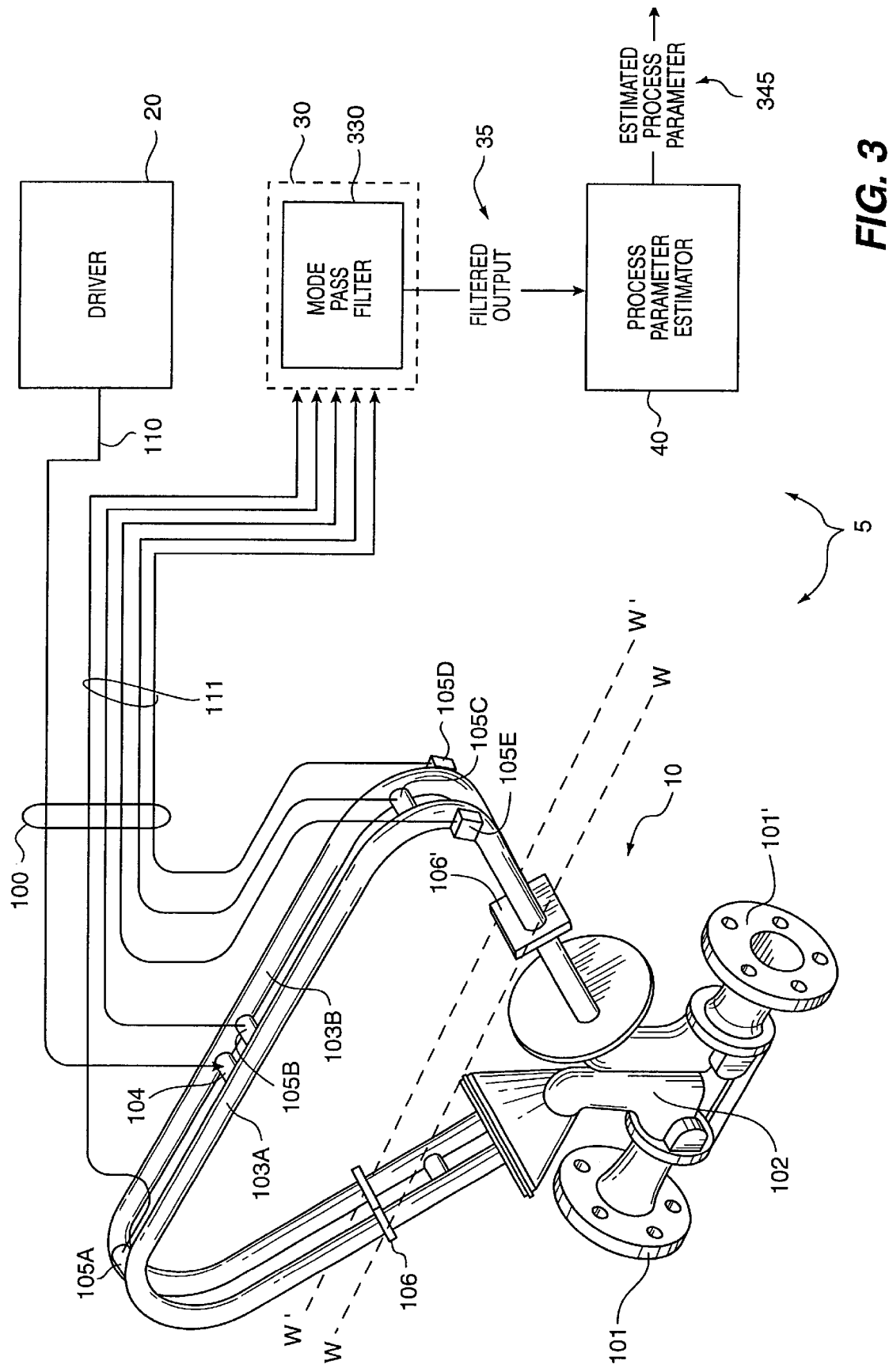
FIG. 3 illustrates another embodiment of a process parameter sensor according to the present invention.

FIG. 3 illustrates an exemplary parameter sensor 5 that implements mode pass filtering according to the present invention. The real normal modal resolver 30 includes a mode pass filter 330 that is responsive to the motion transducers 105A–E. The mode pass filter 30 resolves motion of the conduits 103a, 103B represented by motion signals generated by the transducers 105A–E into a plurality of real normal modal components by producing a filtered output 35 that preferentially represents one or more components of the motion of the conduits 103A, 103B associated with one or more of a plurality of real normal modes, e.g., real normal modes associated with Coriolis force imparted by a material contained in the conduits 103A, 103B.

Figure 4:
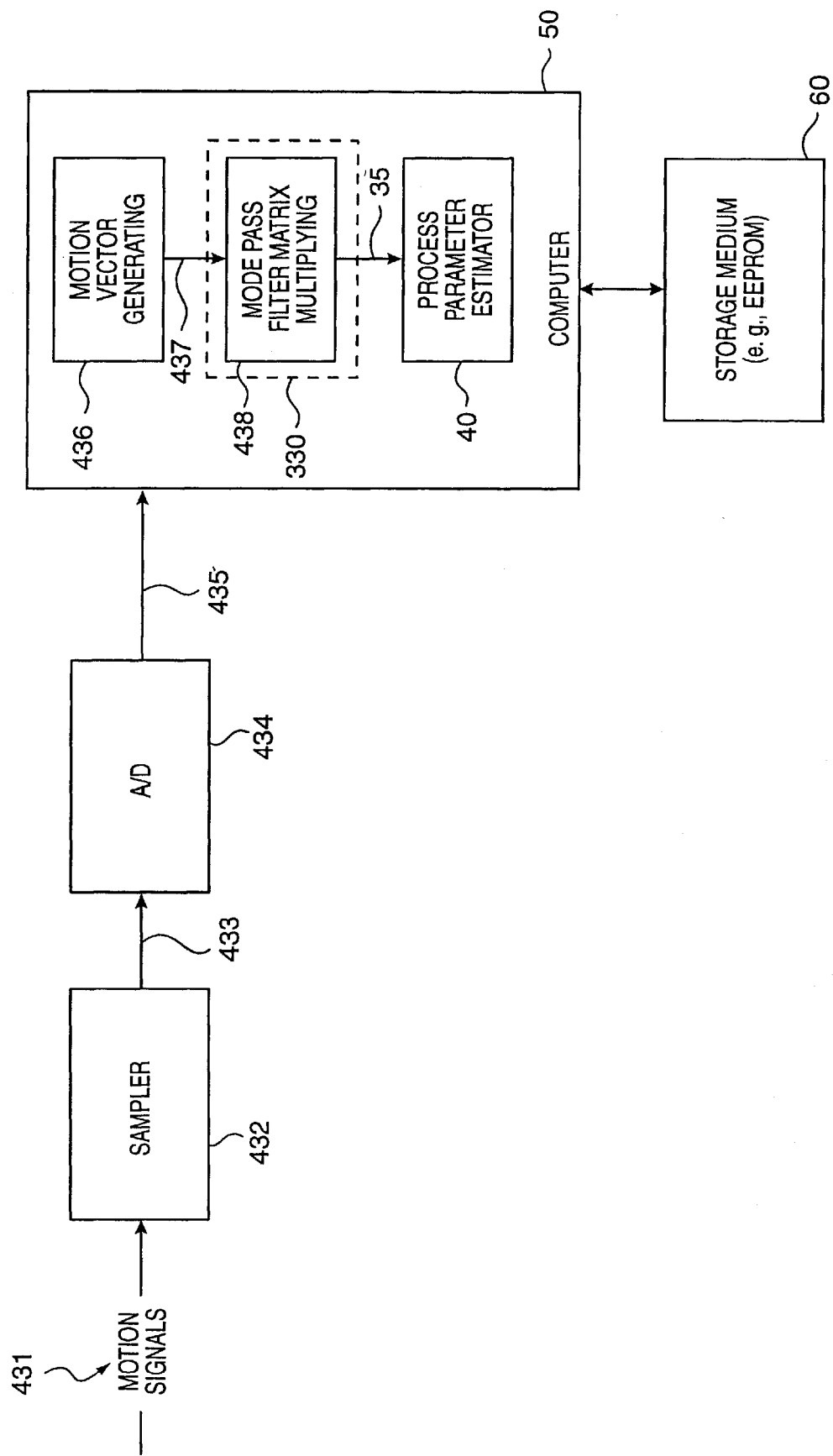
FIG. 4 illustrates an exemplary embodiment of a mode pass filter according to the present invention.

FIG. 4 illustrates an exemplary embodiment of the mode pass filter 330 and the process parameter estimator 40. A sampler 432, for example, a sample-and-hold or similar circuit, provides means for receiving motion transducer motion signals 431, sampling the motion signals 431 and producing samples 433 therefrom for subsequent conversion to digital signal values 435 by an analog-to-digital converter (A/D) 434. Detailed operations of the sampler 432 and A/D 434 may be performed by a number of circuits known to those skilled in the art, and need not be discussed in greater detail herein. Those skilled in the art will appreciate that the motion signals 431 can be processed in a number of ways. For example, anti-alias filtering, post-sampling filtering and similar signal processing may be applied. It will also be understood that, in general, the receiving and converting means illustrated in FIG. 3 may be implemented using special purpose hardware, firmware or software running on special or general-purpose data processing devices or combinations thereof. For example, the sampling and analog to digital conversion functions may be integrated with the transducers 105A–E.

Portions of the mode pass filter 330 may be embodied in a computer 50, e.g., a microprocessor, microcontroller, digital signal processor (DSP) or the like. The computer 50 may comprise, for example, a pipelined DSP especially suited for linear algebraic computations, such as a DSP of the TMS320C4X family of DSPs sold by Texas Instruments, Inc. Configured with appropriate program code, e.g., software and/or firmware and data stored, for example, in a storage medium 60 such as a random access memory (RAM), electrically erasable programmable read-only memory (EEPROM), magnetic disk or the like, the computer 50 provides means 436 for generating a motion vector 437 representing motion of a sensor conduit from the digital values 435. The mode pass filter 330 includes means 438 for multiplying the motion vector 437 by a mode pass filter matrix to produce a filtered motion vector 35 that preferentially represents components of the conduit motion vector associated with one or more desired modes.

Figure 5:
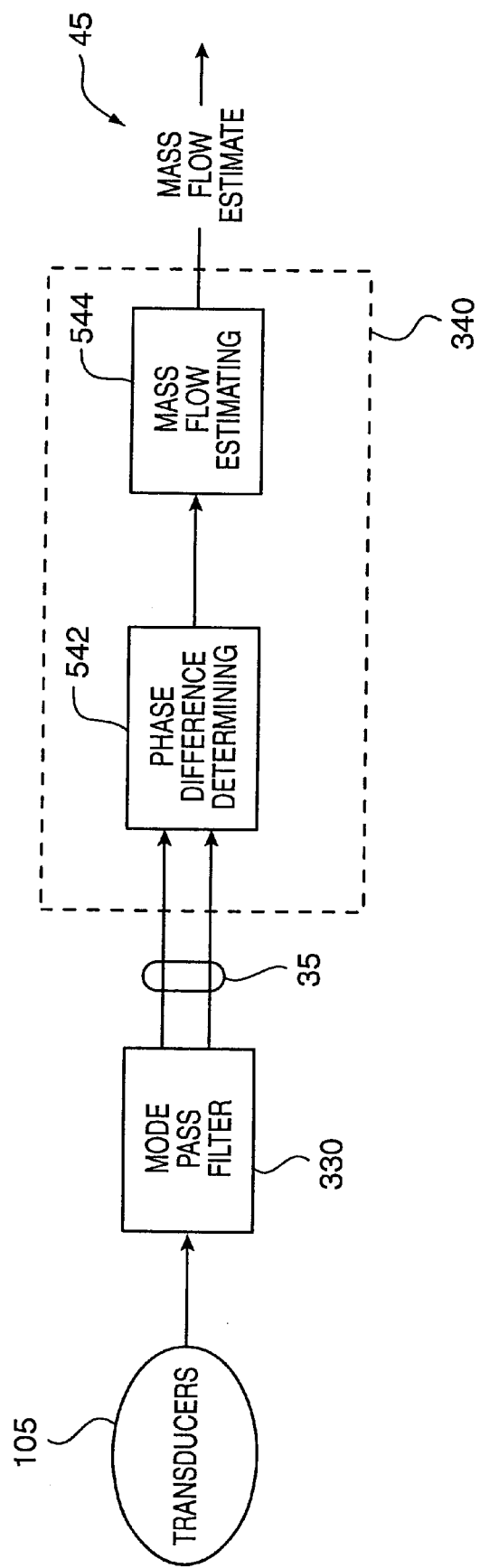
FIG. 5 illustrates an exemplary embodiment of a process parameter estimator according to the present invention.

The process parameter estimator 40 may also be implemented in the computer 50. Embodied as, for example, software or firmware running on the computer 50, the process parameter estimator 40 computes an estimate 45 of a process parameter, e.g., computes an estimated mass flow rate, from the filtered motion vector 35. As illustrated in FIG. 5, for example, the process parameter estimator 40 may include means 542 for determining a phase difference between components of a filtered output 35, and means 544 for estimating mass flow from the determined phase difference.

Figure 6:
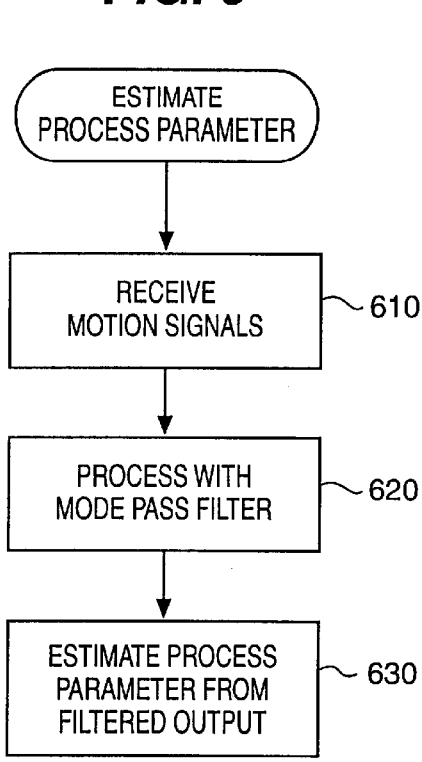
FIGS. 6 and 7 illustrate exemplary operations according to mode pass filtering aspects of the present invention.

FIG. 6 illustrates operations 600 for estimating a process parameter according to mode pass filtering aspects of the present invention. A plurality of motion signals is received representing motion at plurality of locations of a vibrating conduit containing material from a material processing system (Block 610). The received signals are processed to resolve the conduit motion into motion in a plurality of real normal modes by producing an output that preferentially represents a component of the conduit motion associated with a real normal mode, e.g., a mode that preferentially correlates with Coriolis force imparted by a material passing through the conduit (Block 620). A process parameter is estimated from the output (Block 630).

Figure 7:
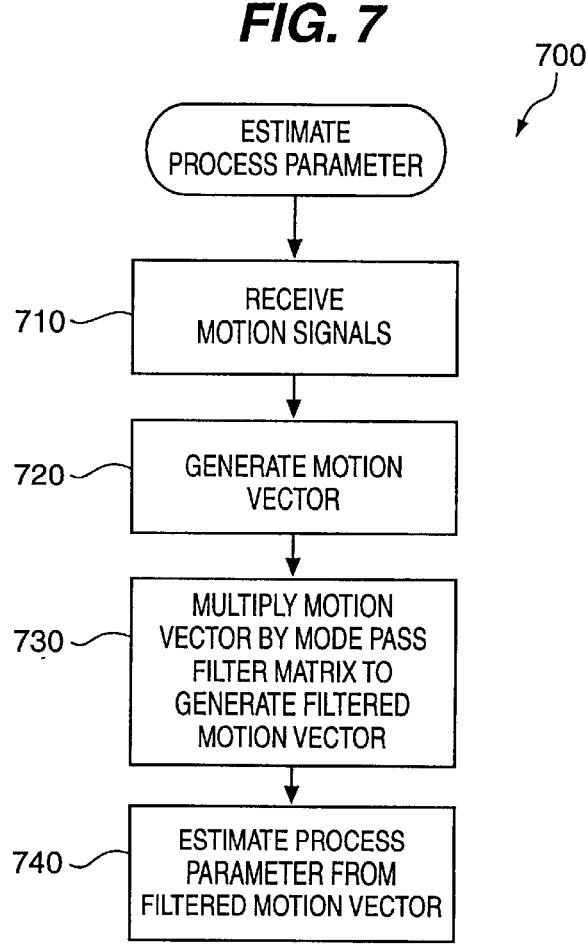

FIG. 7 illustrates operations 700 for estimating a process parameter according to another mode pass filtering aspect of the present invention. Motion signals are received (Block 710) and processed to generate a motion vector representing motion of the sensor conduit (Block 720). The motion vector is multiplied by a selective inverse real normal modal transformation matrix to generate a filtered motion vector that preferentially represents components of the motion vector associate with one or more real normal modes (Block 730). A process parameter is estimated from the filtered motion vector (Block 740).

It will be understood that blocks or combinations of blocks in the flowchart illustrations of FIGS. 6 and 7 can be implemented using computer readable program code, e.g., program instructions and/or data operated on in a computer or data processor such as the computer 50 illustrated in FIG. 4. As used herein, computer readable program code may include but is not limited to such things as operating system commands (e.g., object code), high level language instructions, and the like, as well as data which may be read, accessed or otherwise utilized in conjunction with such program instructions.

The program code may be loaded onto a computer or similar data processing apparatus including, but not limited to, a microprocessor, a microcontroller, a digital signal processor (DSP) or the like. The combination of the program code and computer may provide an apparatus that is operative to implement a function or functions specified in a block or blocks of the flowchart illustrations. Similarly, the program code may be loaded onto a computer or data processing device such that the program code and computer provide means for performing the function or functions specified in a flowchart block or blocks.

The program code may also be stored in a computer-readable storage medium such as a magnetic disk or tape, a bubble memory, a programmable memory device such as an electrically-erasable programmable read-only memory (EEPROM), or the like. The stored program code may direct a computer accessing the storage medium to function such that the program code stored in the storage medium forms an article of manufacture including program code means for implementing the function or functions specified in a flowchart block or blocks. The program code may also be loaded onto a computer to cause a series of operational steps to be performed, thereby implementing a process such that the program code, in conjunction with the computer, provides steps for implementing the functions specified in a flowchart block or blocks. Accordingly, blocks of the flowchart illustrations support apparatus operative to perform the specified functions, combinations of means for performing the specified functions, combinations of steps that perform the specified functions and computer readable program code means embodied in a computer-readable storage medium for performing the specified functions.

It will also be understood that, in general, each block of the flowchart illustrations, and combinations of blocks in the flowchart illustrations, can be implemented by special purpose hardware, software or firmware executing on a general purpose computer, or combinations thereof. For example, functions of the blocks of the flowchart illustrations may be implemented by an application specific integrated circuit (ASIC), programmable gate array or similar special purpose device, or by program instructions and data loaded on and executed by a microprocessor, microcontroller, DSP or other general-purpose computing device.

Estimating A Process Parameter from Estimated Modal Motion

According to another aspect of the present invention, a process parameter such as mass flow is estimated directly from estimated real normal modal motion, i.e., from an estimate of motion in a model of the sensor conduit comprising a plurality of single degree of freedom (SDOF) systems. As discussed above, a complex mode may be represented as a superposition of real normal modes scaled by complex scaling coefficients:

$$\{\Phi_{complex}\}=[\Phi]\{\alpha\}, \quad (10)$$

where $\{\Phi_{complex}\}$ is a complex mode vector, $[\Phi]$ is a matrix of the constituent real normal mode vectors for the complex mode vector $\{\Phi_{complex}\}$ and $\{\alpha\}$ is a vector of generally complex scaling coefficients.

Figure 8:
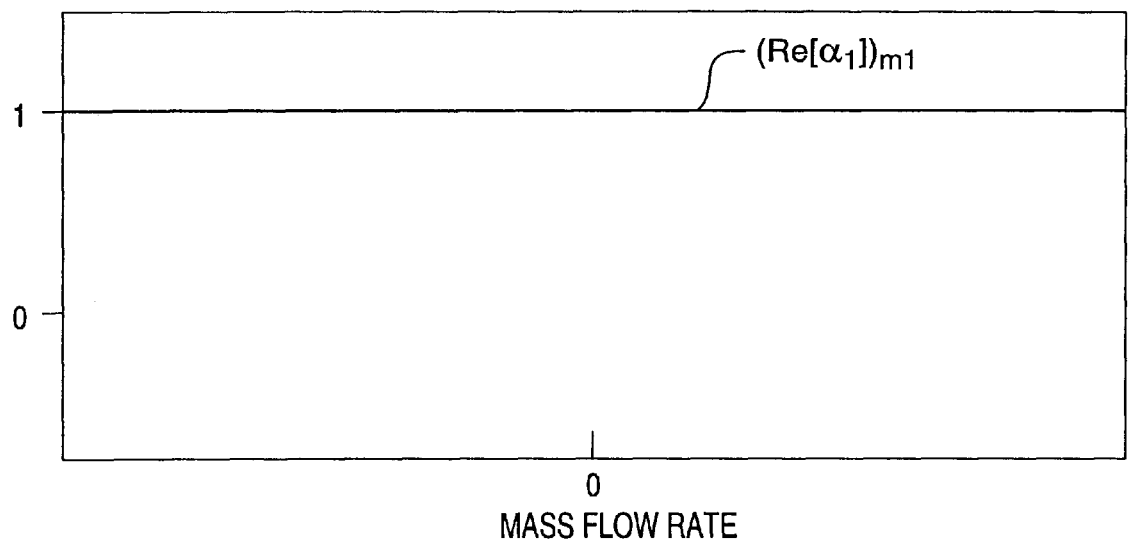
FIGS. 8–12 illustrate modal magnitude effects for a process parameter sensor conduit structure.
Figure 9:
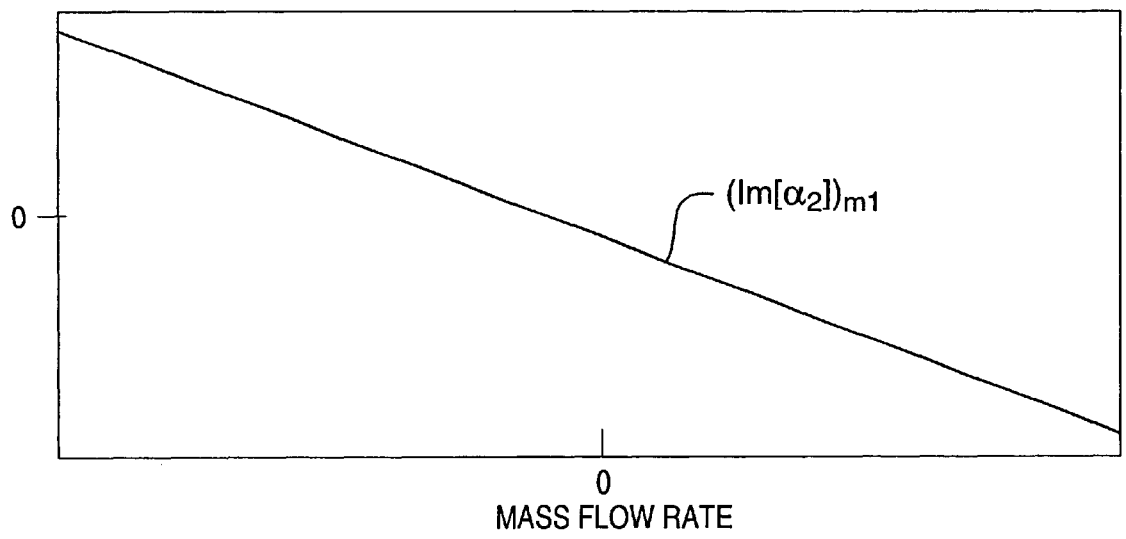
Figure 10:
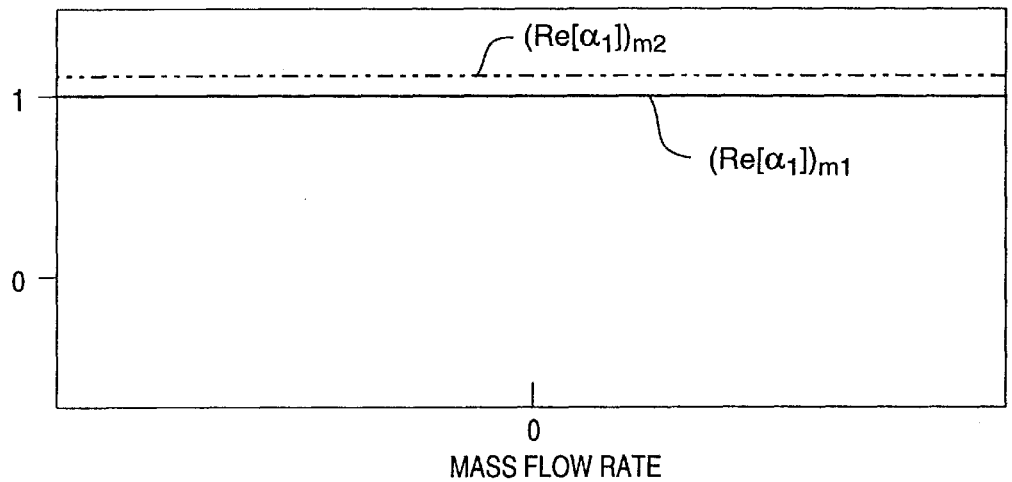
Figure 11:
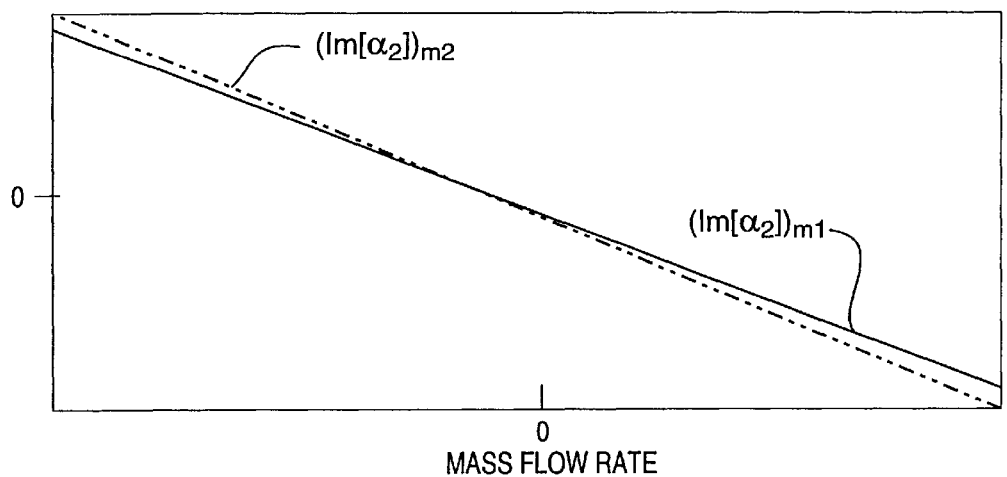

In a Coriolis flowmeter, motion of the sensor conduit is made complex by Coriolis acceleration associated with fluid flowing in the sensor conduit. Accordingly, the scaling coefficient for the imaginary part of the complex flow mode is proportional to the flow rate and can provide information for determining flow rate. However, the magnitude of $\{\alpha\}$ is susceptible to the absolute magnitude of the real normal modal motion, which, as mentioned above, can be arbitrary. FIGS. 8 and 10 illustrate real components $(Re[\alpha_1])_{m1}$, $(Re[\alpha_1])_{m2}$ of a scaling coefficient $\alpha_1$ corresponding to a first out of phase bend mode at respective first and second absolute modal magnitudes $m_1$, $m_2$, and FIGS. 9 and 11 illustrate imaginary components $(Im[\alpha_2])_{m1}$, $(Im[\alpha_2])_{m2}$ of a scaling coefficient $\alpha_2$ corresponding to a first output phase twist mode over a range of mass flow rates at the modal magnitudes $m_1$, $m_2$, for a 3-inch dual-tube Coriolis flowmeter as illustrated in FIG. 1. As can be seen in FIGS. 8 and 10, the real components $(Re[\alpha_1])_{m1}$, $(Re[\alpha_1])_{m2}$ for the first scaling coefficient $\alpha_1$ are generally independent of flow rate, while FIGS. 9 and 11 illustrate that the imaginary components $(Im[\alpha_2])_{m1}$, $(Im[\alpha_2])_{m2}$ of the second scaling coefficient $\alpha_2$ exhibit a substantially linear dependence on flow rate. However, both the real components $(Re[\alpha_1])_{m1}$, $(Re[\alpha_1])_{m2}$ for the first scaling coefficient $\alpha_1$ and the imaginary components $(Im[\alpha_2])_{m1}$, $(Im[\alpha_2])_{m2}$ of the second scaling coefficient $\alpha_2$ are dependent on absolute modal magnitude.

Figure 12:
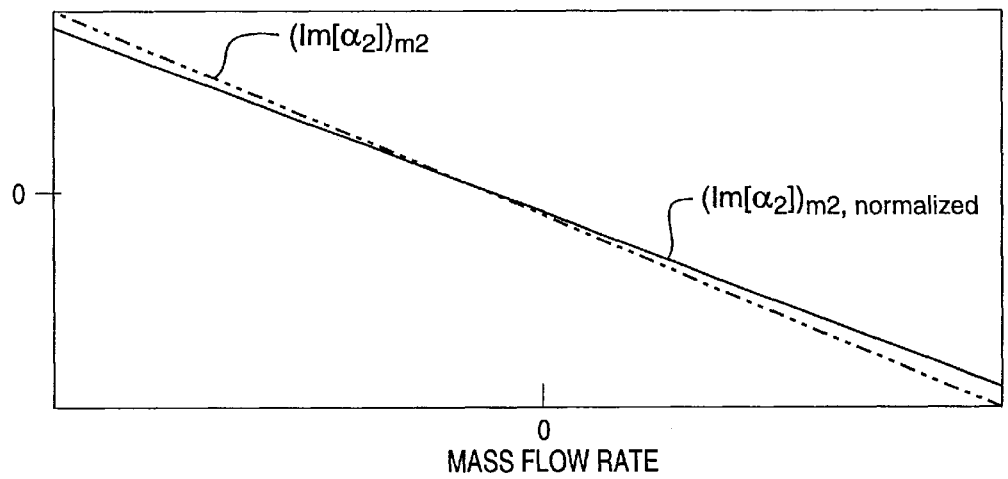

An aspect of the present invention arises from the realization that because the relative magnitude of real normal modes representing a complex motion are invariant (assuming no structural changes) a flow measurement based on the twist mode scaling coefficient $\alpha_2$ that is insensitive to absolute modal magnitude can be made by normalizing the imaginary component $Im[\alpha_2]$ of $\alpha_2$ with respect to the real component $Re[\alpha_1]$ of $\alpha_1$. As illustrated in FIG. 12, normalizing the curve of the imaginary component $(Im[\alpha_2])_{m2}$ of FIG. 9 with respect to the real component $(Re[\alpha_1])_{m2}$ yields a curve for the normalized imaginary component $(Im[\alpha_2])_{m2,normalized}$ that is substantially identical to the curve for the imaginary component $(Im[\alpha_2])_{m1}$, illustrating that the normalized imaginary component of $\alpha_2$ is generally insensitive to mode absolute magnitude.

For the exemplary 3-inch Coriolis sensor described above, a flow rate calibration factor $k_{cal}$ at a known flow rate can be determined by determining the normalized imaginary component of the first out of phase twist mode scaling coefficient and dividing by the known flow rate:

$$k_{cal} = \frac{\left(\frac{Im[\alpha_2]}{Re[\alpha_1]}\right)_{known}}{rate_{known}}. \quad (11)$$

To determine an unknown mass flow rate $rate_{known}$, the normalized imaginary component of the first out of phase twist mode scaling coefficient corresponding to the unknown flow rate is determined and multiplied by the calibration factor $k_{cal}$.

$$rate_{unknown} = \frac{1}{k_{cal}}\left(\frac{Im[\alpha_2]}{Re[\alpha_1]}\right)_{unknown}. \quad (12)$$

Rearranging Equation (10):

$$\{\alpha\}=[\Phi]^{-1}\{\Phi_{complex}\}. \quad (13)$$

The form of Equation (13) is similar to that of Equation (4). By analogy, the conduit motion vector corresponds to the unimodal complex motion vector, and the scaling coefficient vector corresponds to the real normal modal motion vector. Accordingly, mass flow for the exemplary 3-inch Coriolis sensor may be estimated by determining a ratio of estimated modal responses for twist and bend modes of the conduit.

The technique described above can be generalized. For example, higher order estimates may be achieved by using a combination of scaling coefficients for modes associated with Coriolis force normalized with respect to one or more scaling coefficients associated with modes that are correlated, for example, with an excitation applied to the sensor conduit. For the exemplary curved-tube 3-inch Coriolis meter, this could involve using coefficients associated with higher order twist and bend modes, respectively.

The technique described above is also applicable to different conduit configurations. The bend modes and twist modes described for the exemplary 3-inch dual-tube Coriolis sensor may be generally categorized as symmetric modes and antisymmetric modes, respectively. Generally speaking, defining a plane of symmetry orthogonal to the flow axis of a sensor conduit, symmetric modes represent modes in which motion on the first side of a plane of symmetry is mirrored by motion on the second side of the plane of symmetry. For example, the bend modes of the u-shaped Coriolis sensor conduit of FIG. 1 are symmetric with respect to the y-z plane illustrated. Antisymmetric modes represent those modes in which motion on the first side of a plane of symmetry represents a reflection and phase rotation of the motion in the second side of the plane of symmetry. For example, the twist modes of the u-shaped sensor conduit of FIG. 1 are antisymmetric with respect to the y-z plane of FIG. 1. Straight-tube sensors exhibit similar symmetric and antisymmetric modes. Accordingly, the present invention also extends to parameter sensors employing one or more straight conduits and, in general, to sensors employing a variety of conduit configurations.

As mentioned above with respect to mode pass filtering, the number of locations on a sensor conduit can be chosen to exceed the number of real normal modal motion estimation aspects, this means that the real normal modal transformation matrix $[\Phi]$ has more rows than columns. To estimate real normal modal motion [η], a generalized inverse [Φ]† of the real normal modal transformation matrix [Φ] is used, i.e.:

$$\{\eta\} = [\Phi]^\dagger \{x_{response}\}. \quad (14)$$

The resulting estimate of real normal modal motion is thus spatially integrated, the motion signals providing an overdetermined source of information for resolving the conduit motion $\{x_{response}\}$ into the real normal modal motion $\{\eta\}$.

Figure 13:
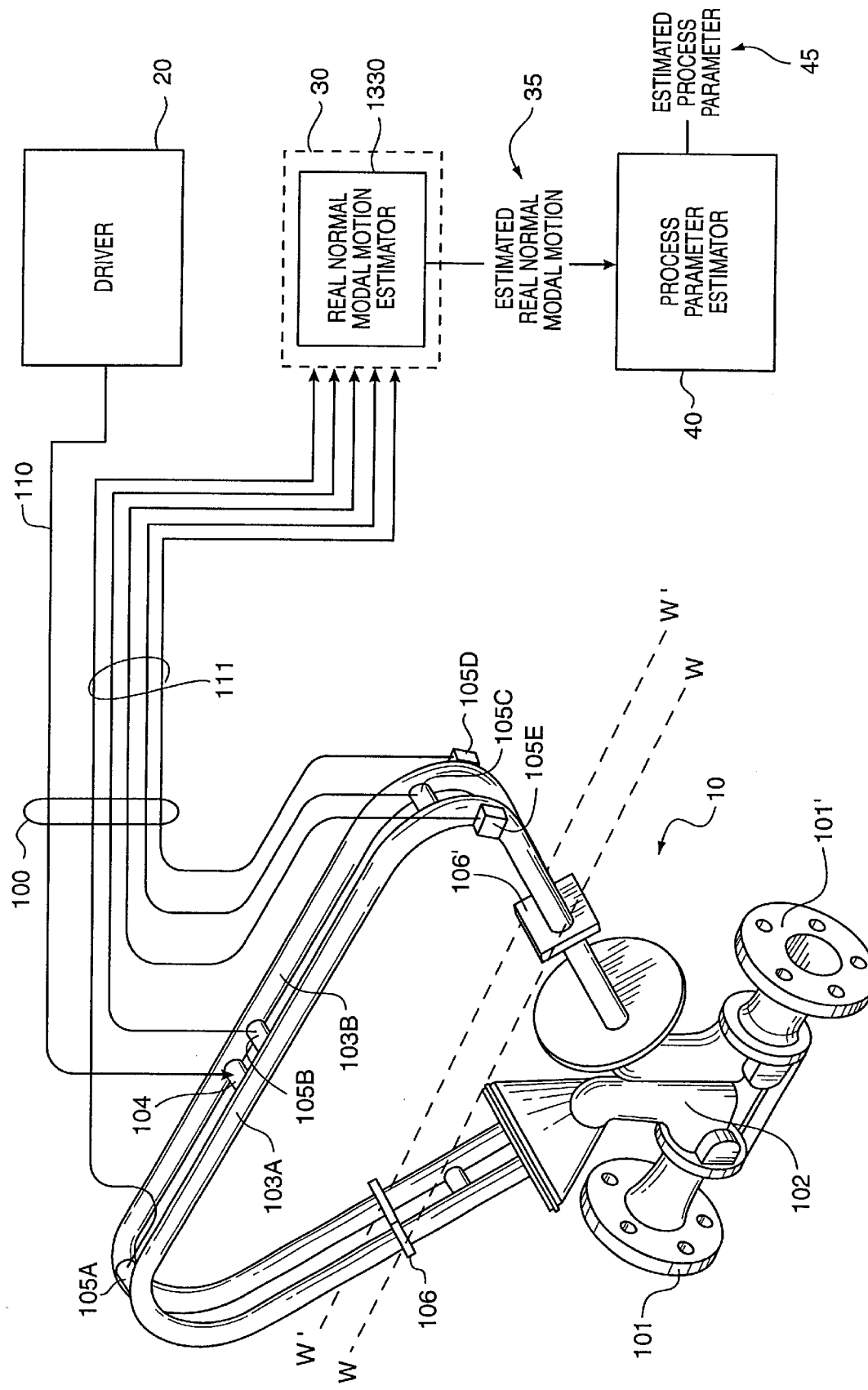
FIG. 13 illustrates another embodiment of a process parameter sensor according to the present invention.

FIG. 13 illustrates an exemplary parameter sensor 5 for performing process parameter estimation directly from an estimate of real normal modal motion. A real normal modal resolver 30 comprises a real normal modal motion estimator 1330 that is responsive to motion signals produced by a plurality of motion transducers 105A–E. The real normal modal motion estimator 1330 resolves motion of the conduits 103A, 103B represented by the motion by generating an estimate of real normal modal motion 35. A process parameter estimator 40 generates an estimated process parameter 45 from the estimated real normal modal motion 35.

Figure 14:
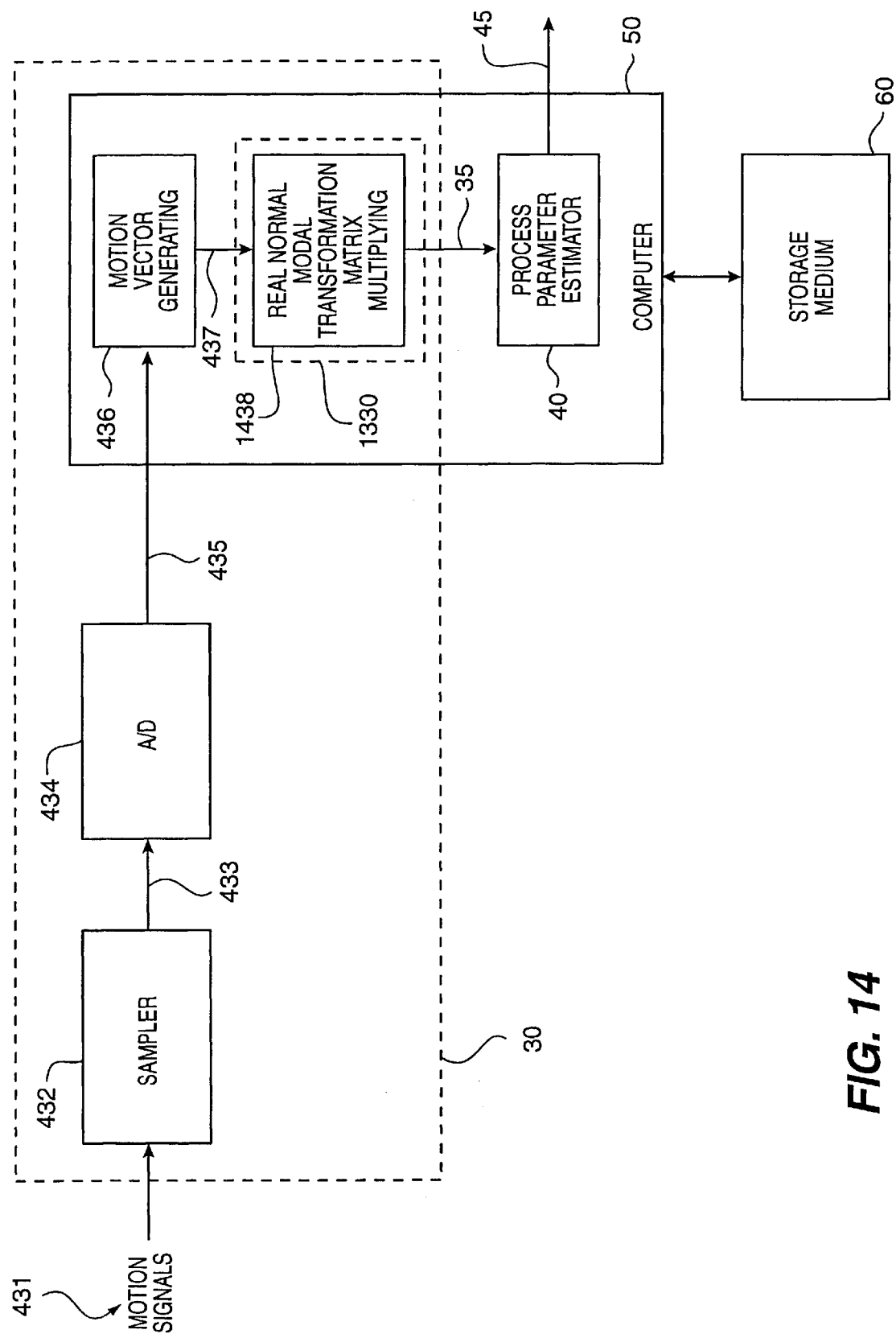
FIG. 14 illustrates an exemplary embodiment of a real normal modal motion estimator according to the present invention.

FIG. 14 illustrates an exemplary embodiment of the real normal modal motion estimator 1330. The real normal modal estimator may 1330 be embodied in a computer 50, e.g., a microprocessor, microcontroller, digital signal processor (DSP) or the like. For example, the computer 50 may comprise a pipelined DSP especially suited for linear algebraic computations, such as one of the DSPs of the TMS320C4X family of DSPs sold by Texas Instruments, Inc. Configured with appropriate program code, e.g., software and/or firmware and data stored, for example, in a storage medium 60 such as a random access memory (RAM), electrically erasable programmable read-only memory (EEPROM), magnetic disk or the like, the computer 50 provides means 1438 for multiplying a motion vector 437 by a modal transformation matrix to produce an estimated real normal modal motion vector 35. The process parameter estimator 40 may also be implemented in the computer 50. Embodied as, for example, software or firmware running on the computer 50, the process parameter estimator 40 computes an estimate 45 of a process parameter, e.g., computes a mass flow rate, from the estimated real normal modal motion vector 35.

Figure 15:
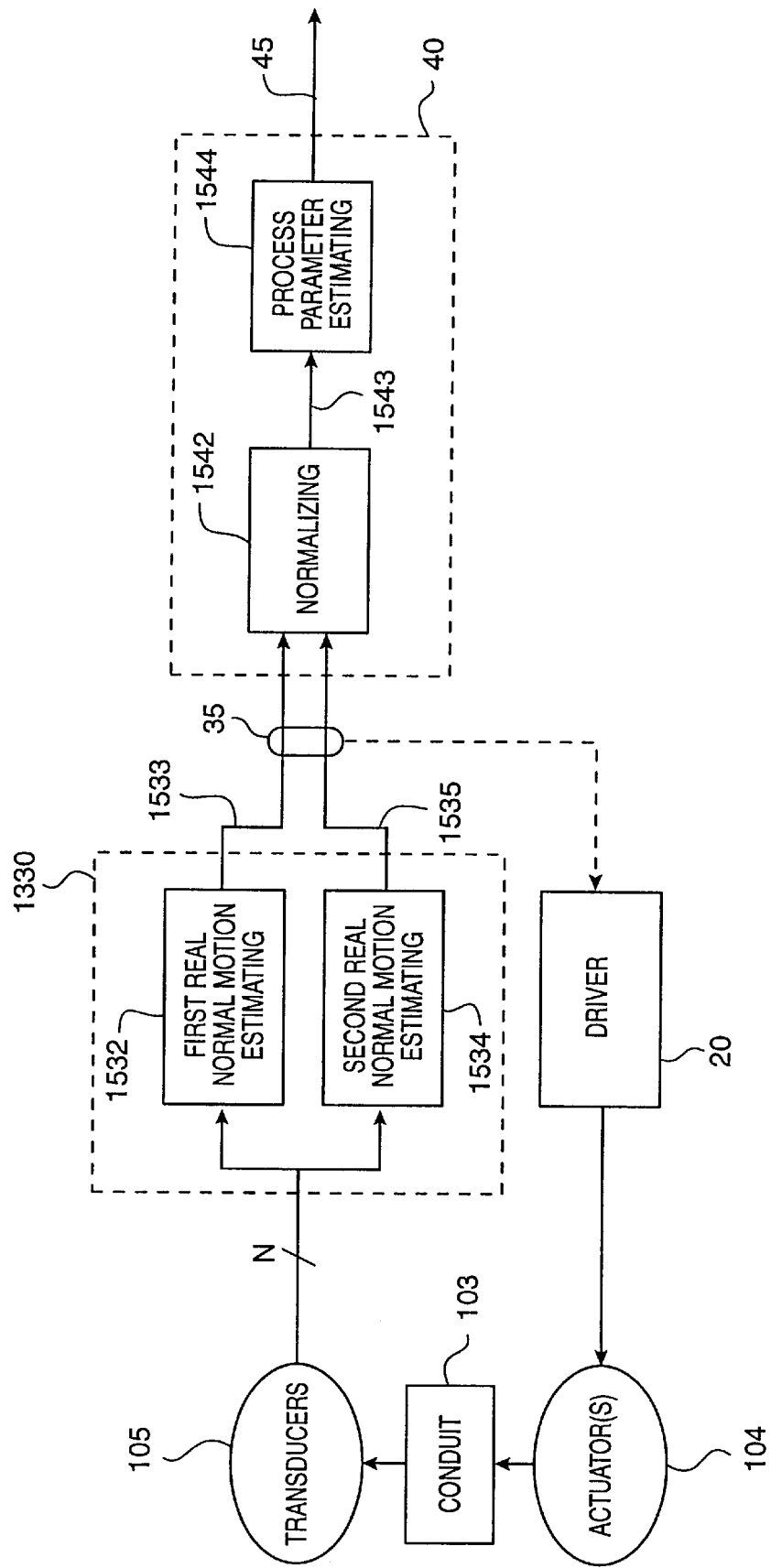
FIG. 15 illustrates an exemplary embodiment of a process parameter estimator according to the present invention.

As illustrated in FIG. 15, the real normal modal motion estimator 1330 may comprise means 1532 for generating an estimate 1533 of motion in a first real normal mode, and means 1534 for generating an estimate 1535 of motion in a second real normal mode. For example, the first and second modes may correspond to the first out of phase bend mode and the first out of phase twist mode, respectively, for a dual u-shaped tube flowmeter such as that illustrated in FIG. 1. The process parameter estimator 40 may include means 1542 for normalizing the second real normal modal motion 1535 with respect to the first real normal modal motion 1533 to produce a normalized estimate 1543 of motion in the second real normal mode. Means 1544 for estimating a process parameter are responsive to the normalizing means 1542, producing an estimated process parameter 45 from the normalized estimate 1543. As illustrated, the estimated modal responses 1533, 1535 may be fed back to a driver 20 to selectively excite one or more selected real normal modes, as described in the aforementioned patent application "Generalized Modal Space Drive Control for a Vibrating Tube Process Parameter Sensor."

Figure 16:
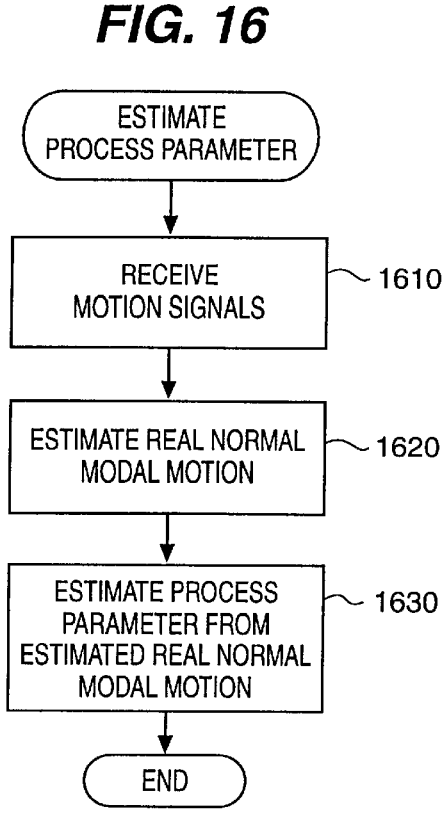
FIGS. 16 and 17 illustrate exemplary operations for estimating a process parameter from estimated real normal modal motion according to aspects of the present invention.

FIG. 16 illustrates operations 1600 for estimating a process parameter according to an aspect of the present invention. A plurality of motion signals representing motion of a sensor conduit is received (Block 1610). The motion signals are processed to resolve the conduit motion into a plurality of real normal modes by estimating motion in a plurality of real normal modes (Block 1620). A process parameter is estimated from the estimated real normal modal motion (Block 1630).

Figure 17:
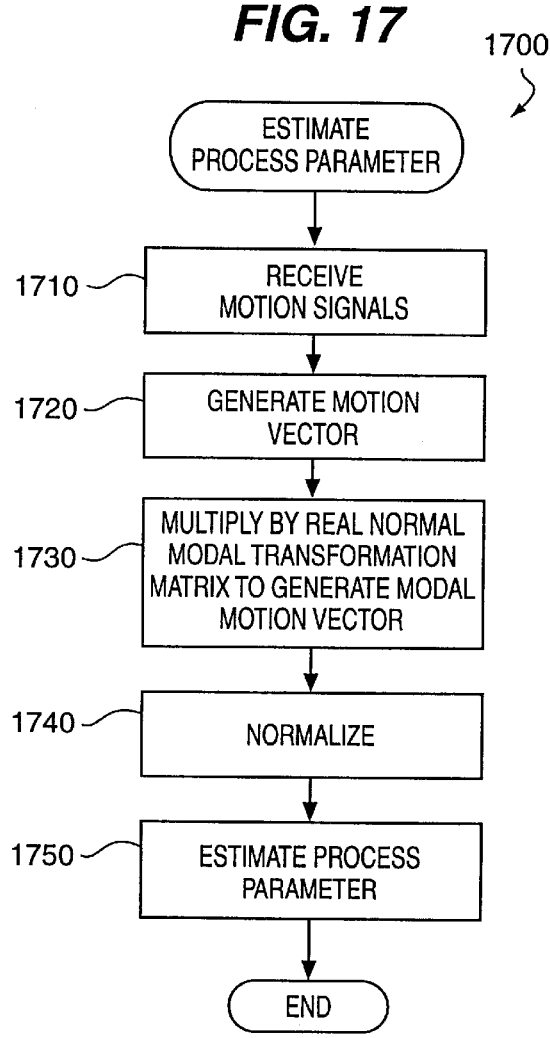

FIG. 17 illustrates operations 1700 for estimating a process parameter according to another aspect of the present invention. A plurality of motion signals representing motion of a sensor conduit is received (Block 1710) and a motion vector generated therefrom (Block 1720). The motion vector is multiplied by a modal transformation matrix to generate a real normal modal motion vector representing real normal modal motion corresponding to the conduit motion (Block 1730). A component of the real normal modal motion vector corresponding to a first mode, e.g., a mode correlated with a Coriolis force imparted by a material in the sensor conduit, is normalized with respect to a component of the real normal modal motion vector corresponding to a second mode, e.g., a mode substantially uncorrelated with the Coriolis force, such as a drive mode (Block 1740). A process parameter such as mass flow is determined from the normalized component of the estimated modal response (Block 1750).

It will be understood that blocks or combinations of blocks in the flowchart illustrations of FIGS. 16 and 17 can be implemented using computer readable program code, e.g., program instructions and/or data operated on in a computer or data processor such as the computer 50 illustrated in FIG. 14. As used herein, computer readable program code may include but is not limited to such things as operating system commands (e.g., object code), high level language instructions, and the like, as well as data which may be read, accessed or otherwise utilized in conjunction with such program instructions.

The program code may be loaded onto a computer or similar data processing apparatus including, but not limited to, a microprocessor, a microcontroller, a digital signal processor (DSP) or the like. The combination of the program code and computer may provide an apparatus that is operative to implement a function or functions specified in a block or blocks of the flowchart illustrations. Similarly, the program code may be loaded onto a computer or data processing device such that the program code and computer provide means for performing the function or functions specified in a flowchart block or blocks.

The program code may also be stored in a computer-readable storage medium such as a magnetic disk or tape, a bubble memory, a programmable memory device such as an electrically-erasable programmable read-only memory (EEPROM), or the like. The stored program code may direct a computer accessing the storage medium to function such that the program code stored in the storage medium forms an article of manufacture including program code means for implementing the function or functions specified in a flowchart block or blocks. The program code may also be loaded onto a computer to cause a series of operational steps to be performed, thereby implementing a process such that the program code, in conjunction with the computer, provides steps for implementing the functions specified in a flowchart block or blocks. Accordingly, blocks of the flowchart illustrations support apparatus operative to perform the specified functions, combinations of means for performing the specified functions, combinations of steps that perform the specified functions and computer readable program code means embodied in a computer-readable storage medium for performing the specified functions.

It will also be understood that, in general, each block of the flowchart illustrations, and combinations of blocks in the flowchart illustrations, can be implemented by special purpose hardware, software or firmware executing on a general purpose computer, or combinations thereof. For example, functions of the blocks of the flowchart illustrations may be implemented by an application specific integrated circuit (ASIC), programmable gate array or similar special purpose device, or by program instructions and data loaded on and executed by a microprocessor, microcontroller, DSP or other general-purpose computing device.

Broadband Excitation

Real normal modal decomposition according to the present invention enables use of broadband excitation. In fact, broadband excitation may be desirable because exciting both desired and undesired real normal modes can provide more complete information for identifying desired real modal responses and generating accurate parameter estimates therefrom. The broadband excitation may include, but is not limited to, random or frequency swept excitation. Frequency-swept excitation may be supplied by one or more actuators operatively associated with the sensor conduit, e.g., by applying a series of substantially coherent excitations to a sensor conduit at varying frequencies. Random excitation may be applied to a conduit by one or more actuators using, for example, a broadband actuator driving signal or an impulse of a predetermined duration. Broadband excitation may also be provided by random environmental forces applied to the sensor conduit, e.g., by energy transfer from a material contained in the sensor conduit, e.g., fluid-structure interaction (FSI), or by vibrations otherwise conveyed to the conduit structure from pumps, compressors and the like.

Figure 18A:
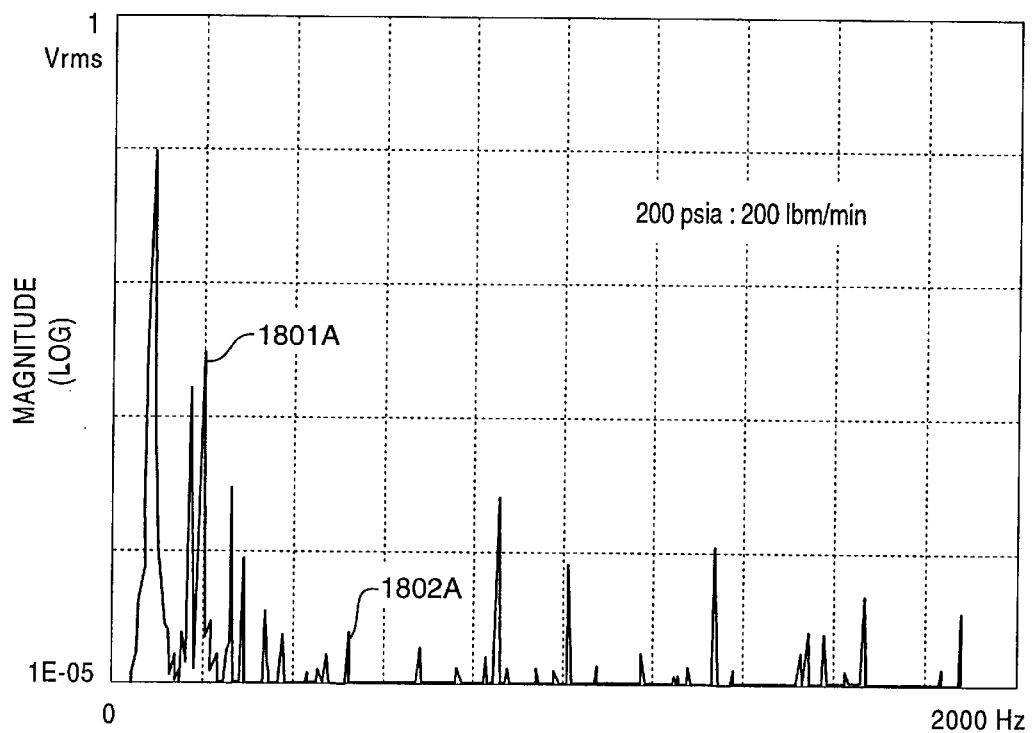
FIGS. 18A and 18B illustrate real normal modes excited by broadband excitation arising from fluid-structure interaction (FSI).
Figure 18B:
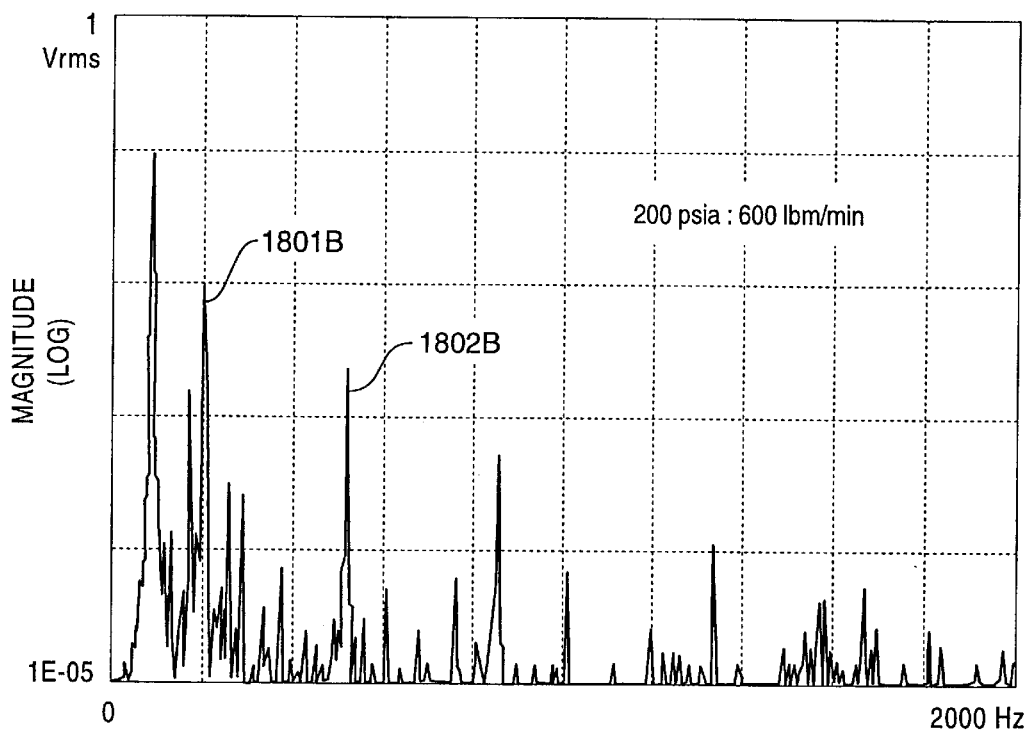

The efficacy of broadband excitation using ambient excitation such as that provided by FSI has been investigated using a dual-tube CFM300 Coriolis flowmeter manufactured by Micro Motion, Inc. operating in a passive fashion, i.e., without excitation from an actuator. FIGS. 18A and 18B illustrate amplitudes at frequencies corresponding to real normal modes of the sensor at mass flow rates of 200 pounds per minute and 600 pounds per minute, respectively. As can be seen from these figures, the amplitudes at frequencies corresponding to the first out of phase twist mode 1801A, 1801B and the second out of phase bend mode 1802A, 1802B vary with mass flow, illustrating that ambient broadband excitation can provide information for real normal modal decomposition of the conduit motion to determine a process parameter such as mass flow according to real normal modal decomposition techniques such as those outlined in detail above.

The ability to use broadband excitation provided by ambient vibration sources such as FSI allows for the construction of "passive" vibrating conduit sensors, i.e., sensors that do not incorporate an actuator. Such a passive sensor may be particularly advantageous in power-limited applications or in applications in which driver power may present a safety concern, e.g., applications in explosive or flammable environments.

Conclusion

As described herein, process parameter estimates are generated by using a real normal modal decomposition of a response of a sensor conduit to excitation. The conduit response is resolved into real normal modal components, e.g., motion in a plurality of real normal modes or components of the conduit motion associated with such real normal modes. The real normal modal components can then be used to generate estimates of process parameters such as mass flow, density, viscosity and the like.

Because the conduit response is resolved into real normal components, contributions from sources such as pump vibration and fluid turbulence can be filtered out by ignoring, eliminating, attenuating or otherwise filtering out real normal modal components not associated with Coriolis forces. In this manner, parameter estimates can be obtained that are potentially more accurate than those obtained by conventional techniques.

Moreover, because a sensor according to the present invention can distinguish between modes, unimodal or near-unimodal excitation is not required. In fact, a sensor conduit may be excited using only environmental excitation. Accordingly, a "passive" parameter sensor, i.e., a sensor including only motion transducers and no actuator, can be constructed, a configuration which may be particularly advantageous in explosive environments or in applications in which power consumption is an important consideration.

Real normal modal decomposition, according to the present invention, can be used to improve the performance of conventional parameter sensors. For example, a conventional curved-tube Coriolis flowmeter may be improved by providing additional motion transducers that produce motion signals that can be processed by a mode pass filter to provide modally-filtered signals for use in conventional phase difference Coriolis measurements. A conventional flowmeter may also be updated, for example, by replacing conventional Coriolis measurement electronics with a DSP-based sensor electronics package that implements a real normal modal motion estimator and a process parameter estimator that directly computes mass flow or other process parameters from an estimated real normal response. In addition to conventional straight and curved tube sensors, modal decomposition employed according to the present invention can also be advantageous in sensors having unconventional, e.g., asymmetric or unbalanced, conduit geometries.

Those skilled in the art will appreciate that the techniques of the present invention can be combined with other techniques to yield improved process parameter techniques. For example, the spatial filtering afforded by the real normal modal decomposition techniques described herein can be combined with frequency domain filtering to achieve spatio-temporal filtering. Because the present invention is amenable to linear algebraic computations, spatial integration can be provided along with the present invention by producing motion signals that provide information for a number of locations that exceed the number of real normal modal components into which conduit notion is resolved. Thus, an overdetermined source of information is provided for resolution of conduit motion into real normal modal components, as described in the aforementioned U.S. patent application, "Improved Vibrating Conduit Parameter Sensors and Methods of Operation Therefor Utilizing Spatial Integration".

The drawings and specification of the present application disclose embodiments of the invention. Although specific terms are employed, they are used in a generic and descriptive sense only and not for purposes of limitation. It is expected that persons skilled in the art can and will make, use or sell alternative embodiments that are within the scope of the following claims either literally or under the Doctrine of Equivalents.

That which is claimed is:

1. A process parameter sensor for determining a process parameter, the sensor comprising:
   a conduit that receives a flow of material;
   means for exciting said conduit to cause said conduit to vibrate;
   a plurality of motion transducers that is affixed to the conduit at a plurality of locations of said conduit and that produce a plurality of motion signals representing motion of the conduit at the plurality of locations;
   a real normal modal resolver that receives the plurality of motion signals from said plurality of motion transducers and that processes the plurality of motion signals to estimates a plurality of real normal modal components from said plurality of motion signals by applying a real normal modal transformation to the received plurality of motion signals to generate the estimate of real normal modal motion; and
   a process parameter estimator that is responsive said real normal modal components being generated and that is operative to estimate a process parameter from at least one of the plurality of estimated real normal modal components.

2. A sensor according to claim 1, wherein said real normal modal resolver comprises a mode pass filter that produces an output from the plurality of motion signals that preferentially represents a component of the motion associated with a real normal mode of said conduit; and
   wherein said process parameter estimator that is responsive to the output being produced to estimate a process from the output.

3. A sensor according to claim 1:
   wherein said real normal modal motion resolver is operative to estimate motion in a plurality of real normal modes; and
   wherein said process parameter estimator is operative to estimate the process parameter from estimated motion for a subset of the plurality of real normal modes.

4. A sensor according to claim 3:
   wherein said real normal modal motion resolver comprises:
     means for estimating motion in a first real normal mode; and
     means for estimating motion in a second real normal mode that is preferentially correlated with a Coriolis force; and
   wherein said process parameter estimator comprises:
     means for normalizing the estimated motion in the second real normal mode with respect to the estimated motion in the first real normal mode to produced a normalized estimate of motion in the second real normal mode; and
     means for estimating the process parameter from the normalized estimate of motion in the second real normal mode.

5. A sensor according to claim 1, wherein the number of said plurality of locations exceeds the number of said plurality of real normal modal components such that the plurality of motion signals represents an overdetermined information source for resolving motion of said conduit into said plurality of real normal modal components.

6. A sensor according to claim 1, wherein said means for exciting said conduit excites a plurality of real normal modes in said conduit.

7. A sensor according to claim 6, wherein said means for exciting comprises an actuator operative to excite a plurality of real normal modes.

8. A sensor according to claim 7, wherein said actuator applies a broadband excitation to said conduit.

9. A sensor according to claim 7, wherein said actuator applies a series of substantially coherent excitations of varying frequencies.

10. A sensor according to claim 6, wherein said means for exciting comprises means for transferring energy from a material in said conduit to thereby excite a plurality of real normal modes.

11. An apparatus for estimating a process parameter from a plurality of motion signals representing motion of a conduit containing material, the apparatus comprising:
    a real normal modal resolver that receives the plurality of motion signals and processes the plurality of motion signals to resolve the motion represented by the plurality of motion signals into a plurality of real normal modal components wherein said real normal modal resolver comprises a mode pass filter that produces an output from the plurality of motion signals that preferentially represents a component of the motion associated with a real normal mode of said conduit and wherein said mode pass filter represents a product of a real normal modal transformation that maps motion in a physical domain to motion in a plurality of single degree of freedom (SDOF) systems and a selective inverse real normal modal transformation that maps motion in a selected set of the plurality of single degree of freedom systems to motion in a physical domain; and
    a process parameter estimator that is responsive to a resolution of said motion into the plurality of real normal modal components by said mode pass filter and that estimates the process parameter from a one component of the plurality of real normal modal components.

12. An apparatus according to claim 11, wherein said mode pass filter preferentially passes a component of the conduit motion associated with a real normal mode.

13. An apparatus according to claim 11, wherein said mode pass filter produces an output that preferentially represents a component of the conduit motion associated with a real normal mode that is preferentially correlated with a Coriolis force associated with material in said conduit.

14. An apparatus according to claim 11, wherein said process parameter estimator comprises a mass flow estimator.

15. An apparatus according to claim 11, further comprising means for processing the received plurality of motion signals to produce a motion vector, and wherein said mode pass filter comprises means for multiplying the motion vector by a mode pass filter matrix to produce a filtered motion vector.

16. An apparatus according to claim 11:
    wherein said mode pass filter is operative to produce a first filtered signal representing motion at a first location of the conduit and a second filtered signal representing motion at a second cation of said conduit; and
    wherein said process parameter estimator comprises:
      means for determining a phase difference between the first filtered signal and the second filtered signal; and
      means, responsive to a determination of the a phase difference, for estimating mass flow from the determined phase difference.

17. An apparatus according to claim 11:
    wherein said real normal modal resolver comprises a real normal modal motion estimator operative to estimate real normal modal motion from the received plurality of motion signals; and wherein said process parameter estimator estimates the process parameter from the estimated real normal modal motion.

18. An apparatus according to claim 17, wherein said real normal modal motion estimator applies a real normal modal transformation to the received plurality of motion signals to generate an estimate of real normal modal motion in said mode pass filter.

19. An apparatus according to claim 17:

wherein said mode pass filter comprises:
means for generating a motion vector; and
means for multiplying the motion vector by a real normal modal transformation matrix to produce a real normal modal motion vector; and
wherein said process parameter estimator comprises means for estimating a process parameter from the real normal modal motion vector.

20. An apparatus according to claim 17:

wherein said real normal modal motion estimator is operative to estimate motion in a plurality of real normal modes; and
wherein said process parameter estimator estimates the process parameter from estimated motion for a subset of the plurality of real normal modes.

21. An apparatus according to claim 20:

wherein said real normal modal motion estimator comprises:
means for estimating motion in a first real normal mode; and
means for estimating motion in a second real normal mode that is preferentially correlated with a Coriolis force; and
wherein said process parameter estimator comprises:
means for normalizing the estimated motion in the second real normal mode with respect to the estimated motion in the first real normal mode to produced a normalized estimate of motion in the second real normal mode; and
means for estimating a process parameter from the normalized estimate of motion in the second real normal mode.

22. An apparatus according to claim 21, wherein said means for normalizing comprises means for normalizing an imaginary component of the estimated motion in the second real normal mode with respect to a real component of the estimated motion in the first real normal mode.

23. An apparatus according to claim 21, wherein said means for estimating motion in a first real normal mode comprises means for estimating motion in a real normal mode that is preferentially correlated with an excitation applied to the conduit.

24. An apparatus according to claim 21 wherein said process parameter estimator comprises means for estimating a process parameter from the normalized estimate of motion in the second real normal mode, a known mass flow and a predetermined normalized estimate of motion in the second real normal mode at the known mass flow.

25. An apparatus according to claim 24, wherein said process parameter estimator comprises means for estimating mass flow.

26. An apparatus according to claim 21:

wherein said means for estimating motion in a first real normal mode comprises means for estimating motion in a symmetric mode;

wherein said means for estimating motion in a second real normal mode comprises means for estimating motion in an antisymmetric mode;

wherein said means for normalizing comprises means for determining a ratio of an imaginary component of the estimated motion in the antisymmetric mode to a real component of the estimated motion in the symmetric mode; and wherein said means for estimating a process parameter from the normalized estimate of motion in the second real normal mode comprises means for estimating a process parameter from the determined ratio.

27. An apparatus according to claim 26, wherein said means for determining the process parameter from the determined ratio comprises means for estimating the process parameter from the determined ratio, a known mass flow and a predetermined ratio corresponding to the known mass flow.

28. An apparatus according to claim 27, wherein said means for estimating the process parameter from the determined ratio comprises means for estimating mass flow.

29. An apparatus according to claim 11, wherein the plurality of motion signals represents an overdetermined information source for resolving motion of said conduit into said plurality of real normal modal components.

30. A method of estimating a process parameter, the method comprising the steps of:

receiving a plurality of motion signals representing motion at a plurality of locations of a vibrating conduit containing material;

processing the received plurality of motion signals to resolve the motion into a plurality of real normal modal components wherein the received plurality of motion signals are processed by being applied to a mode pass filter to produce an output that preferentially represents a component of the motion associated with a real normal mode of the vibrating conduit; and estimating the process parameter from a one of the plurality of real normal modal components output by said mode pass filter.

31. A method according to claim 30, wherein the mode pass filter represents a product of a real normal modal transformation that maps motion in a physical domain to motion in a plurality of single degree of freedom (SDOF) systems and a selective inverse real normal modal transformation that maps motion in a selected set of the plurality of single degree of freedom systems to motion in a physical domain.

32. A method according to claim 30, wherein said step of processing comprises the step of producing an output that preferentially represents a component of the conduit motion associated with a real normal mode that is preferentially correlated with a Coriolis force.

33. A method according to claim 30, wherein said step of estimating comprises the step of estimating mass flow.

34. A method according to claim 30, wherein said step of processing comprises the steps of:

processing the received plurality of motion signals to produce a motion vector; and multiplying the motion vector by a mode pass filter matrix to produce a filtered motion vector.

35. A method according to claim 30:

wherein said step of processing comprises the step of producing a first filtered signal representing motion at a first location of the conduit and a second filtered signal representing motion at a second location of the conduit; and wherein said step of estimating comprises the steps of:
  determining a phase difference between the first filtered signal and the second filtered signal; and
  estimating mass flow from the determined phase difference.

36. A method according to claim 30:
  wherein said step of processing comprises the step of estimating real normal modal motion from the received plurality of motion signals; and
  wherein said step of estimating a process parameter comprises the step of estimating a process parameter associated with the material from the estimated real normal modal motion.

37. A method according to claim 36, wherein said step of estimating real normal modal motion comprises the step of applying a real normal modal transformation to the received plurality of motion signals to generate an estimate of real normal modal motion.

38. A method according to claim 36:
  wherein said step of estimating real normal modal motion comprises the steps of:
    generating a motion vector from the plurality of motion signals; and
    multiplying the motion vector by a real normal modal transformation matrix to produce a real normal modal motion vector; and
  wherein said step of estimating a process parameter comprises the step of estimating a process parameter from the real normal modal motion vector.

39. A method according to claim 36:
  wherein said step of estimating real normal modal motion comprises the step of estimating real normal modal motion for a plurality of real normal modes; and
  wherein said step of estimating a process parameter comprises the step of estimating a process parameter from estimated real normal modal motion of a subset of the plurality of real normal modes.

40. A method according to claim 39:
  wherein said step of estimating real normal modal motion comprises the steps of:
    estimating motion in a first real normal mode; and
    estimating motion in a second real normal mode that is preferentially correlated with a Coriolis force; and
  wherein said step of estimating a process parameter comprises the steps of:
    normalizing the estimated motion in the second real normal mode with respect to the estimated motion in the first real normal mode to produce a normalized estimate of motion in the second real normal mode; and
    estimating a process parameter from the normalized estimate of motion in the second real normal mode.

41. A method according to claim 40, wherein said step of normalizing comprises the step of normalizing an imaginary component of the estimated motion in the second real normal mode with respect to a real component of the estimated motion in the first real normal mode.

42. A method according to claim 40:
  wherein said step of receiving a plurality of motion signals comprises the step of receiving the plurality of motion signals while an excitation is applied to the conduit; and
  wherein said step of estimating motion in a first real normal mode comprises the step of estimating motion in a real normal mode that is preferentially correlated with the excitation applied to the conduit.

43. A method according to claim 40, wherein said step of estimating a process parameter comprises the step of estimating a process parameter from the normalized estimate of motion in the second real normal mode, a known mass flow and a predetermined normalized estimate of motion in the second real normal mode at the known mass flow.

44. A method according to claim 43, wherein said step of estimating a process parameter comprises the step of estimating mass flow.

45. A method according to claim 40:
  wherein said step of estimating motion in a first real normal mode comprises the step of estimating motion in a symmetric mode;
  wherein said step of estimating motion in a second real normal mode comprises the step of estimating motion in an antisymmetric mode;
  wherein said step of normalizing comprises the step of determining a ratio of an imaginary component of the estimated motion in the antisymmetric mode to a real component of the estimated motion in the symmetric mode; and
  wherein said step of estimating a process parameter from the normalized estimate of motion in the second real normal mode comprises the step of estimating a process parameter from the determined ratio.

46. A method according to claim 45, wherein said step of estimating a process parameter comprises the step of estimating a process parameter from the determined ratio, a known mass flow and a predetermined ratio corresponding to the known mass flow.

47. A method according to claim 46, wherein said step of estimating a process parameter from the determined ratio comprises the step of estimating mass flow.

48. A method according to claim 30, wherein the number of locations exceeds the number of resolved real normal modal components such that the plurality of motion signals represents an overdetermined information source for resolving motion of the conduit into the plurality of real normal modal components.

49. A method according to claim 30, wherein said step of receiving is preceded by the step of exciting a plurality of real normal modes in the conduit, and wherein said step of receiving comprises the step of receiving a plurality of motion signals representing motion in response to the excitation.

50. A method according to claim 49 wherein said step of exciting comprises the step of applying a broadband excitation to the conduit.

51. A method according to claim 49 wherein said step of exciting comprises the step of applying a series of substantially coherent excitations of varying frequencies.

52. A method according to claim 49, wherein said step of exciting comprises the step of transferring energy from a material in said conduit to thereby excite a plurality of real normal modes.

53. A computer program product for estimating a process parameter from a plurality of motion signals representing motion of a conduit containing material, the computer program product comprising:
  a computer readable storage medium having computer readable program code means embodied in said medium, said computer readable program code means comprising:
    first computer readable program code means for processing the plurality of motion signals to resolve the motion into a plurality of real normal modal components; and second computer readable program code means for estimating the process parameter from a one of the plurality of real normal modal components.

54. A computer program product according to claim 53:
wherein said first computer readable program code means comprises computer readable program code means for processing the plurality of motion signals to produce an output that preferentially represents a component of the motion associated with a real normal mode of the vibrating conduit; and
wherein said second computer readable program code means comprises computer readable program code means for estimating a process parameter from the output.

55. A computer program product according to claim 54, wherein said first computer readable program code means comprise computer readable program code means for applying a mode pass filter to the plurality of motion signals.

56. A computer program product according to claim 53:
wherein said first computer readable program code means comprises computer readable program code means for estimating real normal modal motion from the plurality of motion signals; and
wherein second computer readable program code means comprises computer readable program code means for estimating a process parameter associated with the material from the estimated real normal modal motion.

57. A computer program product according to claim 54:
wherein said first computer readable program code means comprises computer readable program code means for estimating real normal modal motion for a plurality of real normal modes; and
wherein said second computer readable program code means comprises computer readable program code means for estimating a process parameter from estimated real normal modal motion of a subset of the plurality of real normal modes.

58. A computer program product according to claim 57:
wherein said first computer readable program code means comprises:
computer readable program code means for estimating motion in a first real normal mode; and
computer readable program code means for estimating motion in a second real normal mode that is preferentially correlated with a Coriolis force; and
wherein said second computer readable program code means comprises:
computer readable program code means for normalizing the estimated motion in the second real normal mode with respect to the estimated motion in the first real normal mode to produce a normalized estimate of motion in the second real normal mode; and
computer readable program code means for estimating a process parameter from the normalized estimate of motion in the second real normal mode.

* * * * *

UNITED STATES PATENT AND TRADEMARK OFFICE
CERTIFICATE OF CORRECTION

PATENT NO. : 6,249,752 B1
DATED : June 19, 2001
INVENTOR(S) : Timothy J. Cunningham, David F. Normen, Gary E. Pawlas, Stuart J. Shelley It is certified that error appears in the above-identified patent and that said Letters Patent is hereby corrected as shown below:

Column 20,
Line 58, replace "senting motion at a second cation of said conduit; and" with -- senting motion at a second location of said conduit; and --

Column 22,
Line 38, replace "estimating the process parameter from a one of the" with -- estimating the process parameter from one of the --

Signed and Sealed this

Twenty-sixth Day of February, 2002

Attest:

JAMES E. ROGAN
*Attesting Officer*   *Director of the United States Patent and Trademark Office*